(12) United States Patent
Nammi

(10) Patent No.: US 9,723,601 B2
(45) Date of Patent: Aug. 1, 2017

(54) CONTROL CHANNEL IN A HIGH-SPEED PACKET ACCESS SYSTEM

(71) Applicant: Telefonaktiebolaget LM Ericsson (publ), Stockholm (SE)

(72) Inventor: Sairamesh Nammi, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 595 days.

(21) Appl. No.: 13/816,323

(22) PCT Filed: Nov. 29, 2012

(86) PCT No.: PCT/SE2012/051328
§ 371 (c)(1),
(2) Date: Feb. 11, 2013

(87) PCT Pub. No.: WO2013/169163
PCT Pub. Date: Nov. 14, 2013

(65) Prior Publication Data
US 2014/0161053 A1    Jun. 12, 2014

Related U.S. Application Data

(60) Provisional application No. 61/644,515, filed on May 9, 2012.

(51) Int. Cl.
*H04W 72/04* (2009.01)
*H04B 7/06* (2006.01)
(Continued)

(52) U.S. Cl.
CPC .......... *H04W 72/042* (2013.01); *H04B 7/063* (2013.01); *H04B 7/0658* (2013.01);
(Continued)

(58) Field of Classification Search
CPC . H04W 72/042; H04W 24/10; H04W 52/146; H04W 72/085; H04L 1/0003; H04L 5/001; H04L 5/0035
See application file for complete search history.

(56) References Cited

U.S. PATENT DOCUMENTS

2008/0043867 A1    2/2008    Blanz et al.
2011/0064159 A1    3/2011    Ko et al.
(Continued)

FOREIGN PATENT DOCUMENTS

RU    2437225 C2    12/2011
WO    2011123747 A1    10/2011

OTHER PUBLICATIONS

3GPP, "3rd Generation Partnership Project; Technical Specification Group Radio Access Network; Physical layer procedures (FDD) (Release 10)", 3GPP TS 25.214 V10.6.0, Mar. 2012, 1-100.
(Continued)

*Primary Examiner* — Charles C Jiang
*Assistant Examiner* — Oussama Roudani
(74) *Attorney, Agent, or Firm* — Murphy, Bilak & Homiller, PLLC

(57) ABSTRACT

The proposed technology relates to a method for conveying information from a node to user equipment, UE, in a HSPA, system. The method comprises the step of obtaining (S1) rank information and modulation information related to a four-branch Multiple Input Multiple Output, MIMO, system. The method also comprises the step of combining (S2) the rank information and the modulation information related to the four-branch MIMO system into a bit pattern, and the step of transmitting (S3) the combined rank information and modulation information related to the four-branch MIMO system as said bit pattern in a control channel to the UE. In this way, a power-efficient solution for conveying informa-
(Continued)

tion related to a four-branch MIMO system in a control channel from a node to a UE in a HSPA system is provided.

21 Claims, 18 Drawing Sheets

(51) Int. Cl.
    *H04W 52/14*     (2009.01)
    *H04W 24/10*     (2009.01)

(52) U.S. Cl.
    CPC .......... *H04W 24/10* (2013.01); *H04W 52/146* (2013.01); *Y02B 60/50* (2013.01)

(56) References Cited

U.S. PATENT DOCUMENTS

2013/0155968 A1* 6/2013 Pelletier et al. .............. 370/329
2014/0226735 A1* 8/2014 Zhang ................. H04B 7/0452
                                                                              375/260

OTHER PUBLICATIONS

3rd Generation Partnership Project. 3GPP TS 25.212 V10.2.0 (Mar. 2012). 3rd Generation Partnership Project; Technical Specification Group Radio Access Network; Multiplexing and channel coding (FDD) (Release 10). Mar. 2012.
3rd Generation Partnership Project. "4×4 DL MIMO HS-DPCCH design." 3GPP TSG RAN WG1 Meeting #66bis, R1-113432, Oct. 10-14, 2011, pp. 1-8, Zhuhai, P.R. China.
3rd Generation Partnership Project. "HS-SCCH Design for Four Branch MIMO System." 3GPP TSG-RAN WG1 #68bis, R1-121757, Mar. 26-30, 2012, pp. 1-2, Jeju, South Korea.
3rd Generation Partnership Project. "Layer Mapping Methods for a 2 Codeword MIMO System." 3GPP TSG-RAN WG1 #68bis, R1-121759, Mar. 26-30, 2012, pp. 1-8, Jeju, South Korea.
3rd Generation Partnership Project. "Feedback Channel design for four branch MIMO system." 3GPP TSG-RAN WG1 #68bis, R1-121762, Mar. 26-30, 2012, pp. 1-4, Jeju, Korea.
Unknown, Author, "HS-SCCH Design for Four Branch MIMO System", 3GPP TSG-RAN WG1 #69, R1-122811, Ericsson, Prague, Czech Republic, May 21-25, 2012, 1-5.

* cited by examiner

CONTROL CHANNEL IN A HIGH-SPEED PACKET ACCESS SYSTEM

TECHNICAL FIELD

The field of the present disclosure is that of multiple input-multiple output, MIMO, transmission in a high-speed packet access, HSPA, mobile communication system. More particularly, the proposed technology relates to a method and corresponding node for conveying information from a node to user equipment, UE, and a method and corresponding UE for receiving and processing information from a node, as well as a bit mapping method and corresponding bit mapping device for information for a control channel in a HSPA system, and a method and corresponding device for processing information of such a control channel.

BACKGROUND

HSPA is generally based on High Speed Downlink Packet Access, HSDPA, in the downlink and Enhanced Uplink, EUL, in the uplink. The Enhanced Uplink is sometimes referred to as High Speed Uplink Packet Access, HSUPA.

HSDPA is an enhancement to WCDMA that provides a smooth evolutionary path to higher data rates. HSDPA includes additional transport and control channels such as the High-Speed Downlink Shared Channel, HS-DSCH. EUL includes additional transport and control channels such as the Enhanced Dedicated Channel, E-DCH.

HSDPA enables improvements in capacity and end-user perception by means of efficient sharing of common resources in the cell among many users, rapid adaptation of the transmission parameters to the instantaneous radio channel conditions, increased peak bit rates and reduced delays. Fast scheduling is a mechanism that selects which user(s) to transmit to in a given Transmission Time Interval, TTI. The packet scheduler is a key element in the design of a HSDPA system as it controls the allocation of the shared resources among the users and to a great extent determines the overall behavior of the system. In fact, the scheduler decides which users to serve and, in close cooperation with the link adaptation mechanism, which modulation, power and how many codes should be used for each user. This produces the actual end-users bit rate and system capacity. The High-Speed Downlink Shared Data Channel, HS-DSCH, is shared between users using channel-dependent scheduling to take advantage of favorable channel conditions in order to make best use of the available radio resources. The downlink control information is carried on the High-Speed Shared Control Channel, HS-SCCH.

Multiple Input Multiple Output, MIMO was introduced to increase peak data rates through multi-stream transmission. MIMO generally denotes the use of multiple antennas at both the transmitter and receiver. This can be used to obtain a diversity gain and thereby increase the carrier-to-interference ratio at the receiver. However, the term is also commonly used to denote transmission of multiple layers or multiple streams to improve the end-user throughput by acting as a 'data-rate booster' through spatial multiplexing. Naturally, improved end-user throughput will to some extent also result in an increased system throughput.

So-called dual-stream MIMO, also referred to as dual-branch MIMO, supports transmission of up to two streams or layers. Each stream is normally subject to the same physical-layer processing in terms of coding, spreading and modulation as the corresponding single-layer HSDPA case. Even if only a single stream is transmitted it can be beneficial to exploit both transmit antennas by using transmit diversity. To support dual-stream transmission, the HS-DSCH is modified to support up to two transport blocks per TTI. Each transport block represents one stream or layer. In effect, this means that up to two transport blocks may be simultaneously transmitted on the downlink shared data channel. The standardized HS-SCCH control channel is extended to include so-called rank information about the number of streams, i.e. the number of transport blocks to be simultaneously transmitted to the UE, one or two, and their respective modulation scheme as well as which pre-coding to be used. Reference can e.g. be made to the third generation partnership project, 3GPP, technical specification TS 25.212 V10.2.0

Current work within the third generation partnership project, 3GPP, regarding HSPA evolution include addition of several new features in order to meet the requirements set by the International Mobile Telecommunications Advanced, IMT-A. The main objective of these new features is to increase the average spectral efficiency. One possible technique for improving downlink spectral efficiency would be to introduce support for four-branch MIMO, i.e. utilize up to four transmit and receive antennas, to enhance the spatial multiplexing gains and to offer improved beam forming capabilities. Four-branch MIMO, which is sometimes also referred to as four-stream or four-layer MIMO, provides up to 84 Mbps per 5 MHz carrier for high signal to noise ratio, SNR, users and improves the coverage for low SNR users. Four-branch MIMO supports simultaneous transmission of up to four streams or layers on the downlink to a given UE. The HS-DSCH is thus modified to support up to four transport blocks per TTI, where each transport block represents one stream or layer. In effect, this means that up to four transport blocks may be simultaneously transmitted on the downlink shared data channel.

Introduction of four-branch MIMO will however require a new control channel structure to send the downlink grant information to the UE. It would be desirable to provide a power-efficient solution for such a control channel in a HSPA system.

SUMMARY

It is a general object to provide a power-efficient solution for a control channel in a HSPA system.

It is a specific object to provide a method and corresponding node for conveying information from a node to user equipment in a HSPA system.

It is also an object to provide a method and corresponding UE for receiving and processing information from a node in a HSPA system.

Yet another object is to provide a bit mapping method and corresponding bit mapping device for information for a control channel in a HSPA system.

The inventor has recognized that four-branch MIMO requires more bits for reporting information such as rank information. This means more power is required for the control channel. However, more power to the control channel degrades the performance of the associated data channel, and hence degrades the system throughput.

According to a first aspect, there is provided a method for conveying information from a node to user equipment, UE, in a HSPA, system. The method comprises the step of obtaining rank information and modulation information related to a four-branch MIMO system. The method also comprises the step of combining the rank information and the modulation information related to the four-branch MIMO system into a bit pattern, and the step of transmitting the combined rank information and modulation information related to the four-branch MIMO system as said bit pattern in a control channel to the UE.

The inventor has realized that the rank information and the modulation information related to a four-branch MIMO system can be combined into a common bit pattern to reduce the number of bits that have to be transmitted in the control channel to the UE, thus saving valuable power resources that can be used for the data channel to maintain high user and system throughput in a HSPA system.

According to a second aspect, there is provided a method of receiving and processing information from a node in a HSPA system. The method comprises the step of receiving, in a control channel from the node, information including a bit pattern representing combined rank information and modulation information related to a four-branch MIMO system. The method also comprises the step of processing the received information including decombining the combined rank information and modulation information related to the four-branch MIMO system.

In this way, there is provided a solution for receiving and processing the combined rank information and modulation information related to a four-branch MIMO system, to enable proper decoding of data to be received on a data channel associated with the control channel.

According to a third aspect, there is provided a bit mapping method for information for a control channel in a HSPA system. The method comprises the step of obtaining rank information and modulation information related to a four-branch MIMO system. The method also comprises the step of combining the rank information and the modulation information related to the four-branch MIMO system into a bit pattern for the control channel.

This novel HSPA bit-mapping method enables a power-efficient solution for a control channel in a HSPA system.

According to a fourth aspect, there is provided a node configured for conveying information to user equipment, UE, in a HSPA system. The node comprises processing circuitry configured to obtain rank information and modulation information related to a four-branch MIMO system. The processing circuitry is also configured to combine the rank information and the modulation information related to the four-branch MIMO system into a bit pattern. The node further comprises communication circuitry configured to transmit the combined rank and modulation information related to the four-branch MIMO system as said bit pattern in a control channel to the UE.

According to a fifth aspect, there is provided user equipment, UE, configured for receiving and processing information from a node in a HSPA system. The UE comprises communication circuitry configured to receive, in a control channel from the node, information including a bit pattern representing combined rank information and modulation information related to a four-branch MIMO system. The UE also comprises processing circuitry configured to process the received information including decombining the combined rank information and modulation information related to the four-branch MIMO system.

According to a sixth aspect, there is provided a bit mapping device for information for a control channel in a HSPA system. The device comprises processing circuitry configured to obtain rank information and modulation information related to a four-branch Multiple Input Multiple Output, MIMO, system. The processing circuitry is also configured to combine the rank information and the modulation information related to the four-branch MIMO system into a bit pattern for the control channel.

According to a seventh aspect, there is provided a method of processing information of a control channel in a High Speed Packet Access, HSPA, system. The method comprises the step of obtaining information from the control channel including a bit pattern representing combined rank information and modulation information related to a four-branch Multiple Input Multiple Output, MIMO, system. The method also comprises the step of decombining the combined rank information and modulation information related to the four-branch MIMO system by mapping the bit pattern into rank information and modulation information.

According to an eighth aspect, there is provided a device for processing information of a control channel in a High Speed Packet Access, HSPA, system. The device comprises processing circuitry configured to obtain information from the control channel including a bit pattern representing combined rank information and modulation information related to a four-branch Multiple Input Multiple Output, MIMO, system. The processing circuitry is also configured to decombine the combined rank information and modulation information related to the four-branch MIMO system by mapping the bit pattern into rank information and modulation information.

Other advantages will be appreciated when reading the detailed description.

BRIEF DESCRIPTION OF THE DRAWINGS

The proposed technology, together with further objects and advantages thereof, may best be understood by making reference to the following description taken together with the accompanying drawings, in which:

FIG. 13 is implemented.

DETAILED DESCRIPTION

Throughout the drawings, the same reference numbers are used for similar or corresponding elements.

Figure 1:
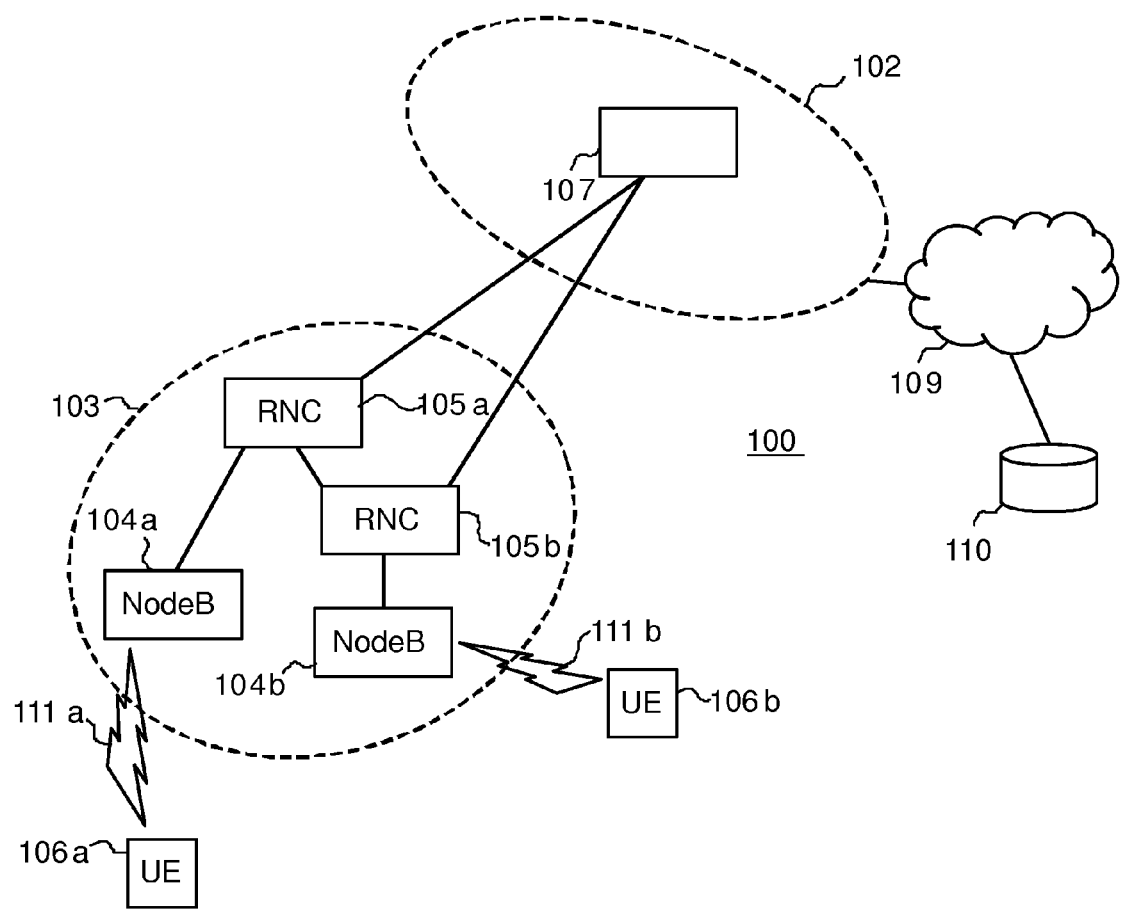
FIG. 1 is a schematic diagram that illustrates schematically an example of a mobile communication system.

FIG. 1 illustrates schematically a universal mobile telecommunications system, UMTS, network 100 in which the present methods and apparatuses can be implemented. It should be noted, however, that the skilled person will readily be able to perform implementations in other similar communication systems involving transmission of data between nodes.

In FIG. 1 the UMTS network 100 comprises a core network 102 and a UMTS terrestrial radio access network, UTRAN, 103. The UTRAN 103 comprises a number of nodes in the form of radio network controllers, RNC, 105a, 105b, each of which is coupled to a set of neighbouring nodes in the form of one or more NodeB 104a, 104b. Each NodeB 104 is responsible for a given geographical radio cell and the controlling RNC 105 is responsible for routing user and signalling data between that NodeB 104 and the core network 102. All of the RNC's 105 are coupled to one another. A general outline of the UTRAN 103 is given in 3GPP technical specification TS 25.401 V3.2.0.

FIG. 1 also illustrates communicating entities in the form of mobile devices or user equipment, UE, 106a, 106b connected to a respective NodeB 104a, 104b in the UTRAN 103 via a respective air interface 111a, 111b. Mobile devices served by one NodeB, such as UE 106a served by NodeB 104a, are located in a so-called radio cell. The core network 102 comprises a number of nodes represented by node 107 and provides communication services to the UE 106 via the UTRAN 103, for example when communicating with the Internet 109 where, schematically, a server 110 illustrates an entity with which the mobile devices 106 may communicate. As the skilled person realizes, the network 100 in FIG. 1 may comprise a large number of similar functional units in the core network 102 and the UTRAN 103, and in typical realizations of networks, the number of mobile devices may be very large.

Furthermore, as will be discussed in detail later on, communication between the nodes in the UTRAN 103 and the mobile devices 106 may follow the protocols as specified by 3GPP technical specification TS 25.214 V10.6.0.

Figure 2:
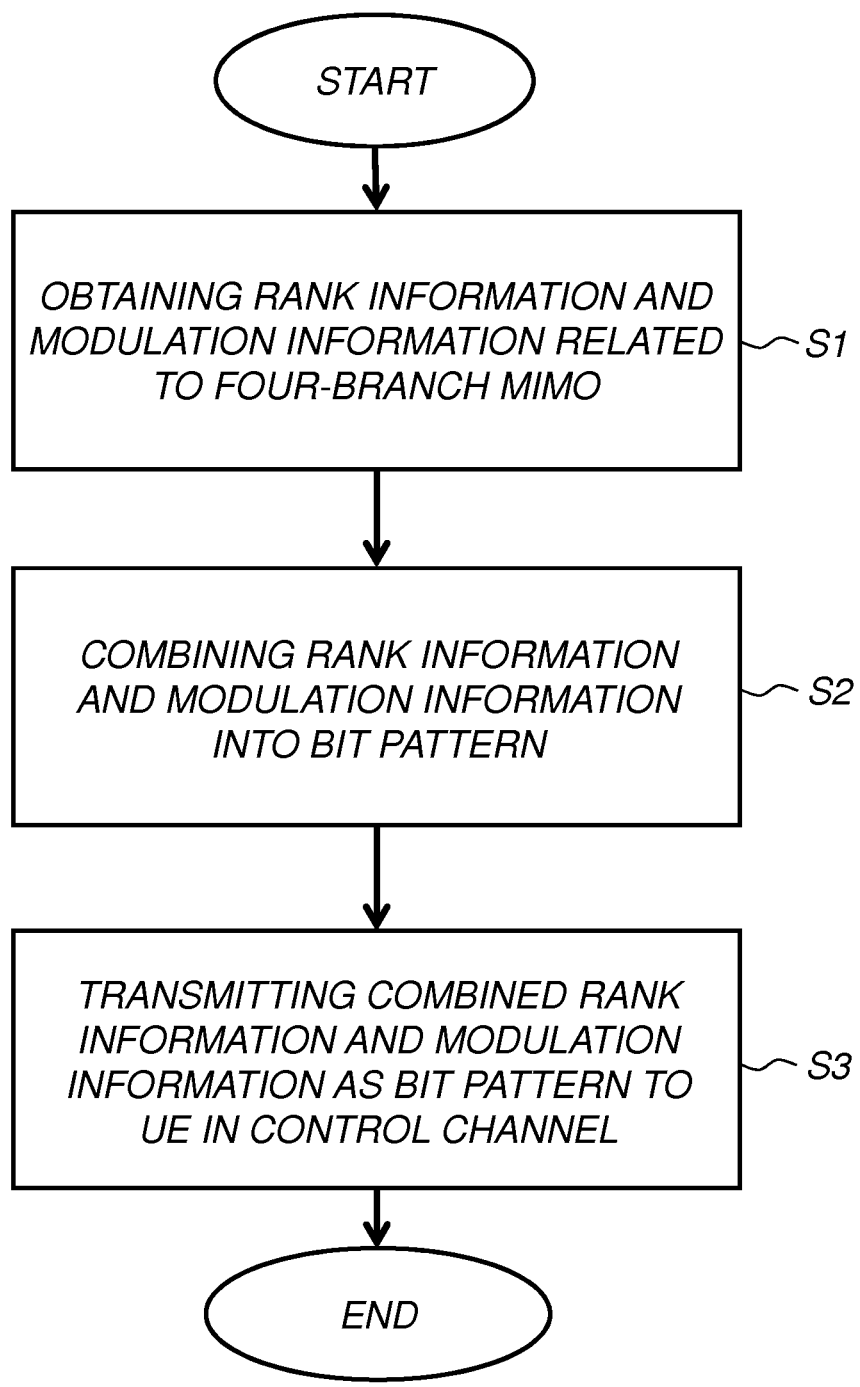
FIG. 2 is a schematic flow diagram illustrating an example of a method for conveying information from a node to user equipment, UE, in a HSPA, system according to an embodiment.

FIG. 2 is a schematic flow diagram illustrating an example of a method for conveying information from a node to user equipment, UE, in a HSPA, system according to an embodiment. The method comprises the step of obtaining (S1) rank information and modulation information related to a four-branch Multiple Input Multiple Output, MIMO, system. The method also comprises the step of combining (S2) the rank information and the modulation information related to the four-branch MIMO system into a bit pattern, and the step of transmitting (S3) the combined rank information and modulation information related to the four-branch MIMO system as said bit pattern in a control channel to the UE.

In this way, a power-efficient solution for conveying information related to a four-branch MIMO system in a control channel from a node to a UE in a HSPA system is provided.

As previously mentioned, the inventor has recognized that the rank information and the modulation information related to a four-branch MIMO system can be combined into a common bit pattern to reduce the number of bits that have to be transmitted in the control channel to the UE. This saves valuable power resources that can be used for the data channel to maintain high user and system throughput in a HSPA system.

By way of example, the control channel is a High Speed Shared Control Channel, HS-SCCH in the HSPA system. The corresponding downlink data channel may then be the High-Speed Downlink Shared Data Channel, HS-DSCH, also referred to as the High-Speed Physical Downlink Shared Data Channel, HS-PDSCH.

As mentioned, MIMO technology improves transmission and reception efficiency by using multiple transmit antennas and multiple receive antennas. The MIMO technology generally includes spatial multiplexing, transmit diversity and/or beamforming. A MIMO channel matrix is defined by the number of transmit antennas and the number of receive antennas, and can be divided into multiple independent channels. Each such channel is often referred to as a stream or layer, and the rank of the MIMO channel matrix typically corresponds to the number of streams or layers. The downlink data channel such as the HS-DSCH is modified to support multiple transport blocks per TTI, where each transport block represents one stream or layer. According to well-accepted terminology, the rank information is representative of the number of transport blocks to be simultaneously transmitted on the data channel associated with the control channel; e.g. see US Patent Applications 2008/0043867 and 2011/0064159.

The rank information and modulation information can be obtained for example by i) determining this information in the node more or less independently, or with the use of input from the UE and/or other node(s), or ii) receiving this information from the UE or other node(s), or iii) any feasible combination thereof. In this sense, the step of 'obtaining' rank information and modulation information can also be referred to as a step of 'providing' rank information and modulation information.

By way of example, a possible scenario may be for the UE to send information representative of rank and modulation scheme to the NodeB, and the NodeB then finally decides which rank and modulation to be used at least partly based on the received information.

The inventor has discovered that the rank information and the modulation information related to a four-branch MIMO system for a HSPA system can be efficiently mapped into a bit pattern of 5 bits.

Figure 3:
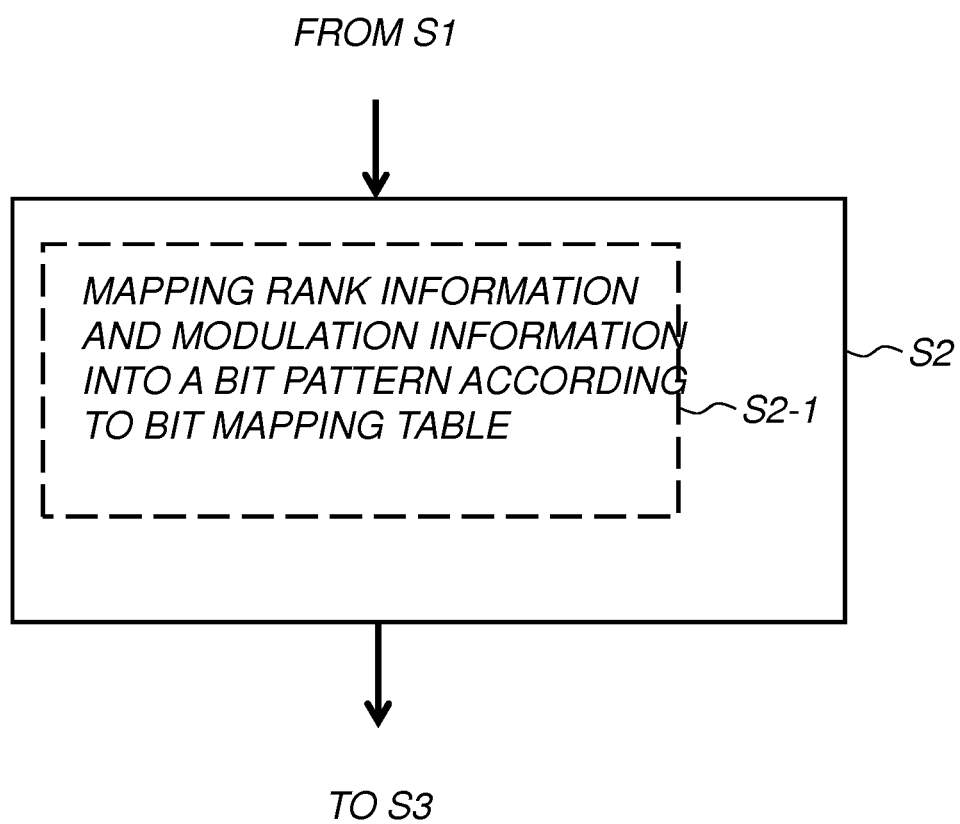
FIG. 3 is a schematic diagram illustrating an example of the combining step according to a particular embodiment.

As illustrated in FIG. 3, the step (S2) of combining the rank information and the modulation information related to the four-branch MIMO system into a bit pattern may comprise the step (S2-1) of mapping the rank information and the modulation information into a bit pattern according to a bit mapping table. Table 1 below illustrates an example of a bit mapping table:

| Bit Pattern | RI | Modulation-I | Modulation-II |
|---|---|---|---|
| 00000 | 1 | QPSK | NA |
| 00001 | 1 | 16 QAM | NA |
| 00010 | 1 | 64 QAM | NA |
| 00011 | 2 | QPSK | QPSK |
| 00100 | 2 | QPSK | 16 QAM |
| 00101 | 2 | QPSK | 64 QAM |
| 00110 | 2 | 16 QAM | QPSK |
| 00111 | 2 | 16 QAM | 16 QAM |
| 01000 | 2 | 16 QAM | 64 QAM |
| 01001 | 2 | 64 QAM | QPSK |
| 01010 | 2 | 64 QAM | 16 QAM |
| 01011 | 2 | 64 QAM | 64 QAM |
| 01100 | 3 | QPSK | QPSK |
| 01101 | 3 | QPSK | 16 QAM |
| 01110 | 3 | QPSK | 64 QAM |
| 01111 | 3 | 16 QAM | QPSK |
| 10000 | 3 | 16 QAM | 16 QAM |
| 10001 | 3 | 16 QAM | 64 QAM |
| 10010 | 3 | 64 QAM | QPSK |
| 10011 | 3 | 64 QAM | 16 QAM |
| 10100 | 3 | 64 QAM | 64 QAM |
| 10101 | 4 | QPSK | QPSK |
| 10110 | 4 | QPSK | 16 QAM |
| 10111 | 4 | QPSK | 64 QAM |
| 11000 | 4 | 16 QAM | QPSK |
| 11001 | 4 | 16 QAM | 16 QAM |
| 11010 | 4 | 16 QAM | 64 QAM |
| 11011 | 4 | 64 QAM | QPSK |
| 11100 | 4 | 64 QAM | 16 QAM |
| 11101 | 4 | 64 QAM | 64 QAM |
| 11110 | NA | NA | NA |
| 11111 | NA | NA | NA | where RI denotes 'Rank Information', QPSK denotes 'Quadrature Phase Shift Keying', QAM denotes 'Quadrature Amplitude Modulation', NA denotes 'Not Applicable', and Modulation-I and Modulation-II denotes modulation for different transport blocks.

In other words, the rank information and the modulation information are jointly coded according to the bit mapping table.

For example, the rank information and the modulation information can be determined by the node based on suitable input, determined or recommended by another node and signaled to the node, determined or recommended by the UE and signaled to the node or a combination thereof.

In practice, suitable representations of the rank information and modulation information, e.g. maintained as two information variables or stored in two information fields, are combined into a common bit pattern. Any suitable original representations of the rank information and modulation information are feasible, as long as the rank information and modulation information are combined into a bit pattern that is finally reported to the UE. In other words, the rank information and modulation information are jointly represented by this bit pattern. In a preferred example, the rank information and modulation information related to the four-branch MIMO system are combined and reported to the UE in one information field in the control channel.

In a particular example, especially when more than two transport blocks are to be simultaneously transmitted for parallel streams, the modulation may be assigned to pairs of transport blocks. By way of example, with four parallel streams it is possible to use Modulation-I for transport blocks 1 and 4, and use Modulation-II for transport blocks 2 and 3. With three parallel streams, this would mean using Modulation-I for transport block 1, and Modulation-II for transport blocks 2 and 3. It is possible to use a different 'pairing' of the transport blocks of parallel streams.

Preferably, the rank information and the modulation information are coupled for each Hybrid Automatic Repeat reQuest, HARQ, process.

Figure 4:
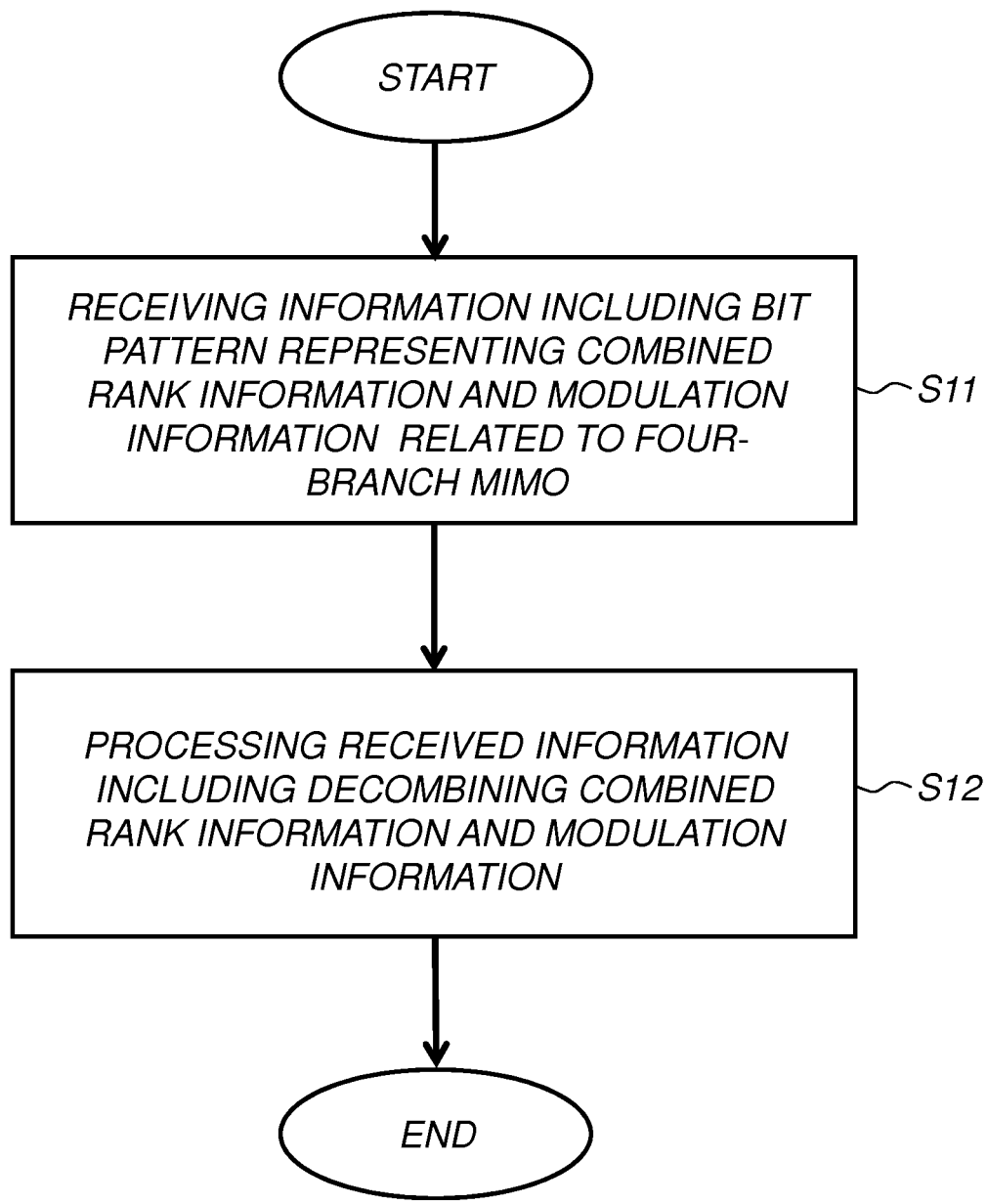
FIG. 4 is a schematic flow diagram illustrating an example of a method of receiving and processing information from a node in a HSPA system according to an embodiment.

FIG. 4 is a schematic flow diagram illustrating an example of a method of receiving and processing information from a node in a HSPA system according to an embodiment. The method comprises the step of receiving (S11), in a control channel from the node, information including a bit pattern representing combined rank information and modulation information related to a four-branch Multiple Input Multiple Output, MIMO, system. The method also comprises the step of processing (S12) the received information including decombining the combined rank information and modulation information related to said four-branch MIMO system.

In this way, there is provided a solution for receiving and processing the combined rank information and modulation information related to a four-branch MIMO system, to enable proper decoding of data to be received on a data channel associated with the control channel.

Preferably, the control channel is a High Speed Shared Control Channel, HS-SCCH, in the HSPA system, as previously exemplified.

The rank information is representative of the number of transport blocks to be simultaneously transmitted on the data channel associated with the control channel.

Figure 5:
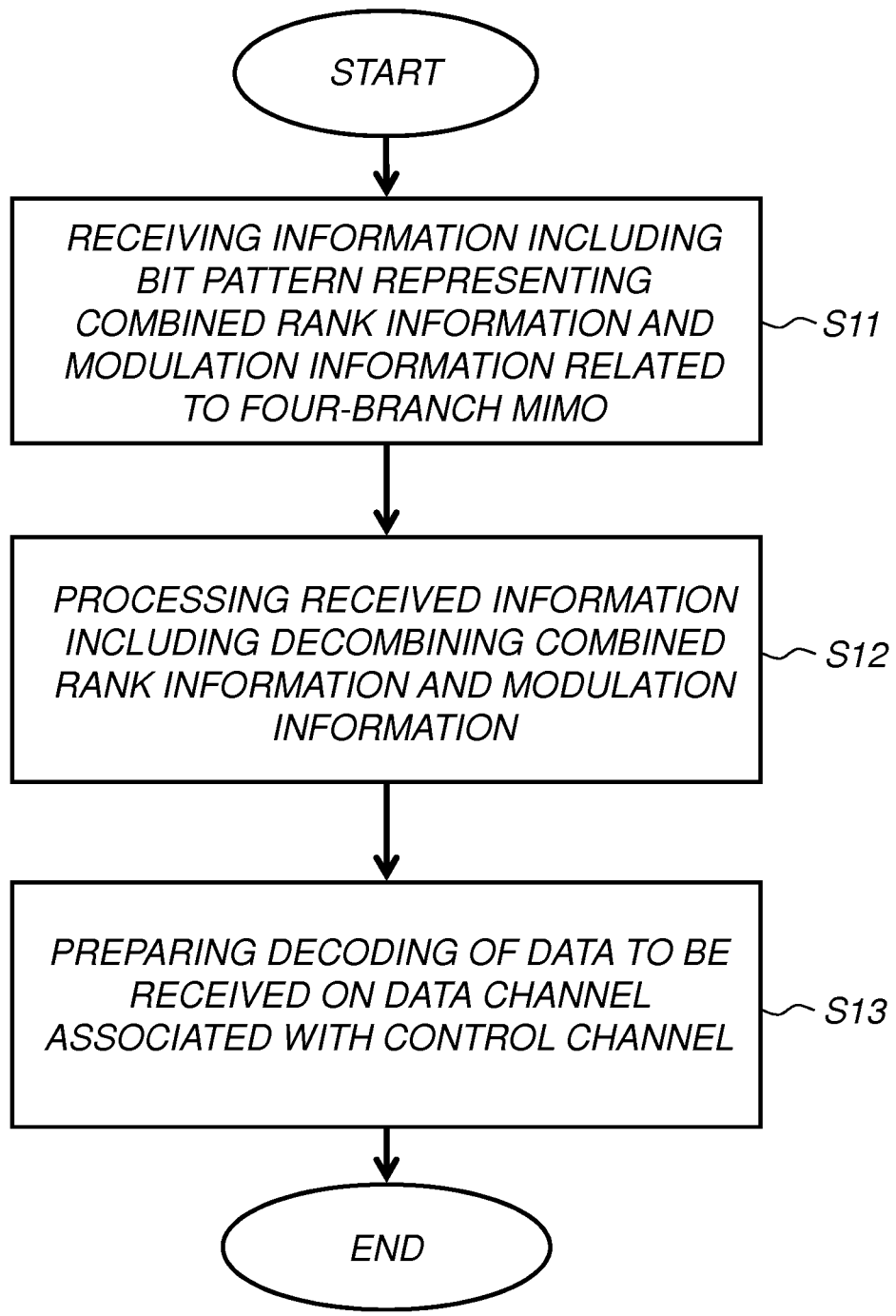
FIG. 5 is a schematic flow diagram illustrating an example of a method of receiving and processing information from a node in a HSPA system, including also preparing decoding of data based on the processed information according to an embodiment.

As illustrated in FIG. 5, the method may also involve preparing decoding of data based on the processed information. More specifically, in this particular example, the method also includes the step (S13) of preparing decoding of data to be received on the data channel associated with the control channel based on the processed information.

In a preferred example, the bit pattern representing combined rank information and modulation information related to the four-branch MIMO system is a bit pattern of 5 bits.

Figure 6:
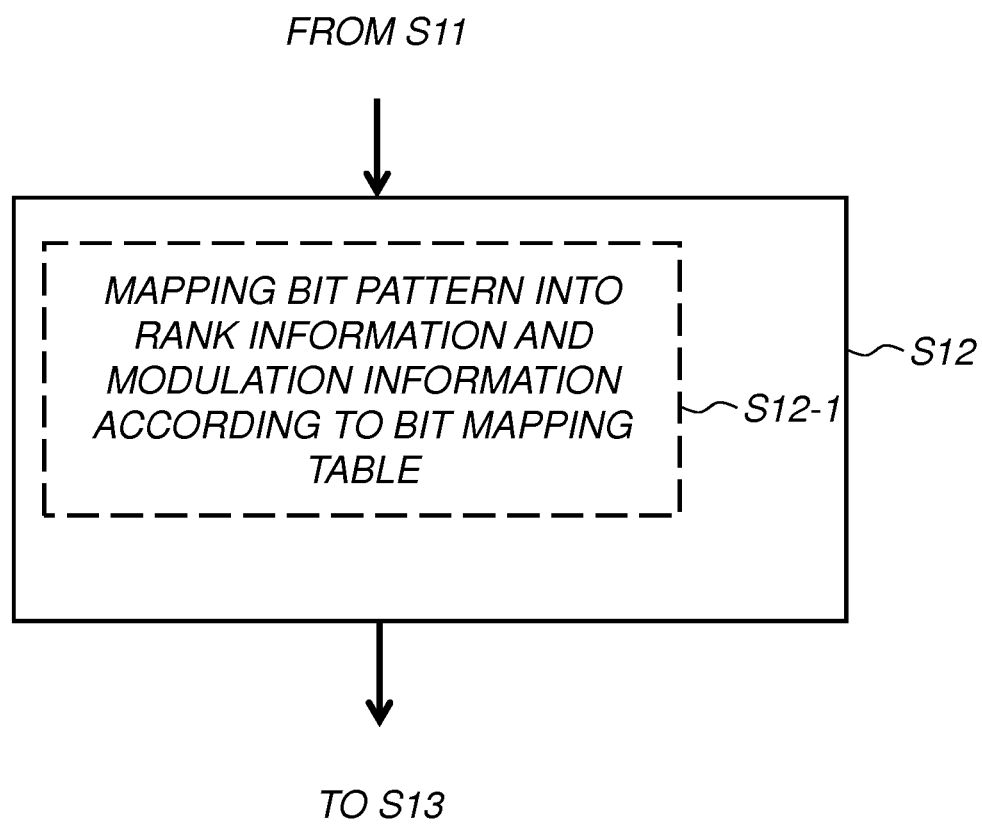
FIG. 6 is a schematic diagram illustrating an example of the processing step according to a particular embodiment.

FIG. 6 is a schematic diagram illustrating an example of the processing step according to a particular embodiment. In this example, the step (S12) of processing the received information comprises the step (S12-1) of mapping the bit pattern into rank information and modulation information according to a bit mapping table. Preferably, the bit mapping table illustrated in Table 1 above is used.

On the network side, the bit mapping table is used to map rank information and modulation information into a bit pattern. On the UE side, the bit mapping table is used to map the bit pattern into rank information and modulation information. In other words, the network node combines the rank information and modulation information into the bit pattern for transmission to the UE. The UE then decombines the received bit pattern back into rank information and modulation information to enable decoding of data to be transmitted on the shared downlink data channel associated with the control channel.

Figure 7A:
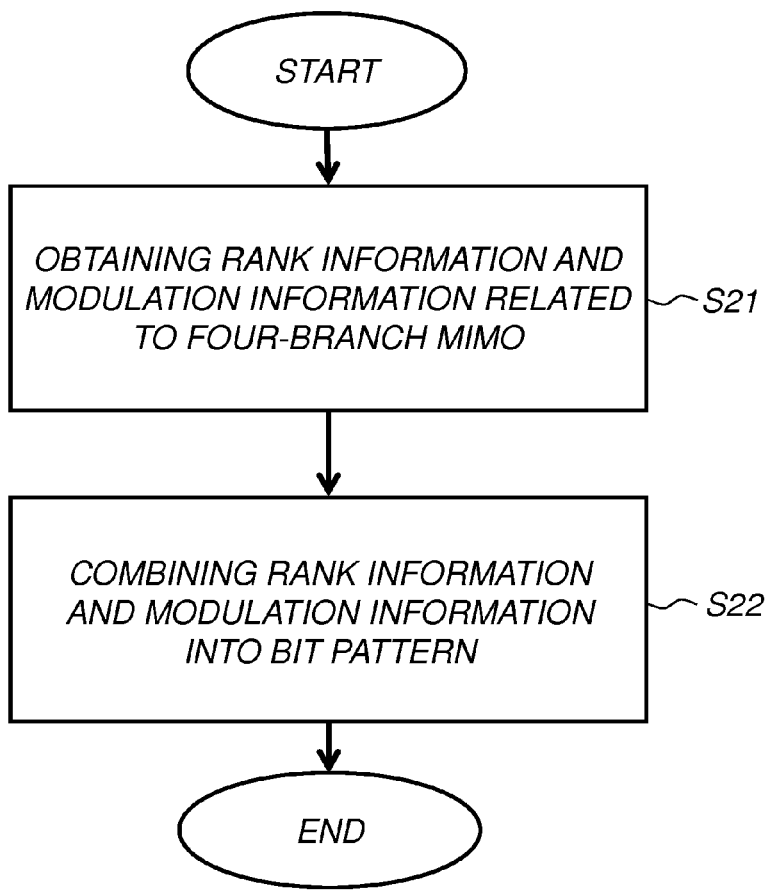
FIG. 7A is a schematic flow diagram illustrating an example of a bit mapping method for information for a control channel in a HSPA system according to an embodiment.

FIG. 7A is a schematic flow diagram illustrating an example of a bit mapping method for information for a control channel in a HSPA system according to an embodiment. The method comprises the step of obtaining (S21) rank information and modulation information related to a four-branch Multiple Input Multiple Output, MIMO, system. The method also comprises the step of combining (S22) the rank information and the modulation information related to the four-branch MIMO system into a bit pattern for the control channel.

Preferably, the control channel is a High Speed Shared Control Channel, HS-SCCH in the HSPA system. In a preferred example, the rank information and the modulation information related to the four-branch MIMO system are mapped into a bit pattern of 5 bits.

Figure 7B:
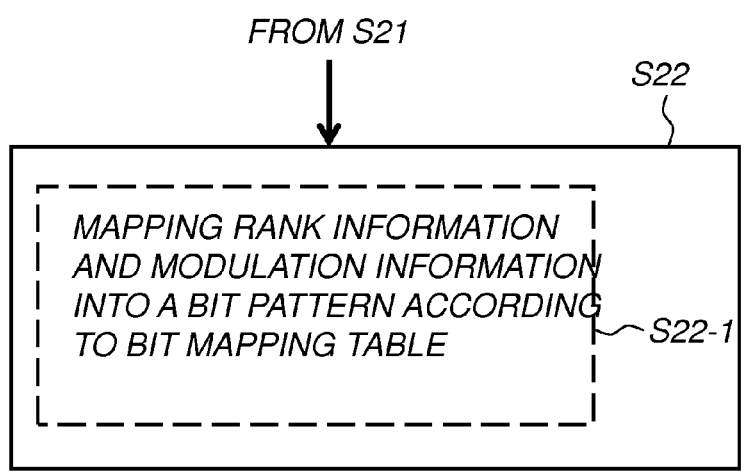
FIG. 7B is a schematic flow diagram illustrating an example of the combining step according to a particular embodiment.

FIG. 7B is a schematic flow diagram illustrating an example of the combining step according to a particular embodiment. For example, the step (S22) of combining of the rank information and the modulation information related to the four-branch MIMO system into a bit pattern may comprise the step (S22-1) of mapping the rank information and the modulation information into the bit pattern according to a bit mapping table such as the one shown in Table 1 above.

The resulting bit pattern may then be inserted into the control channel structure in one information field.

Figure 21:
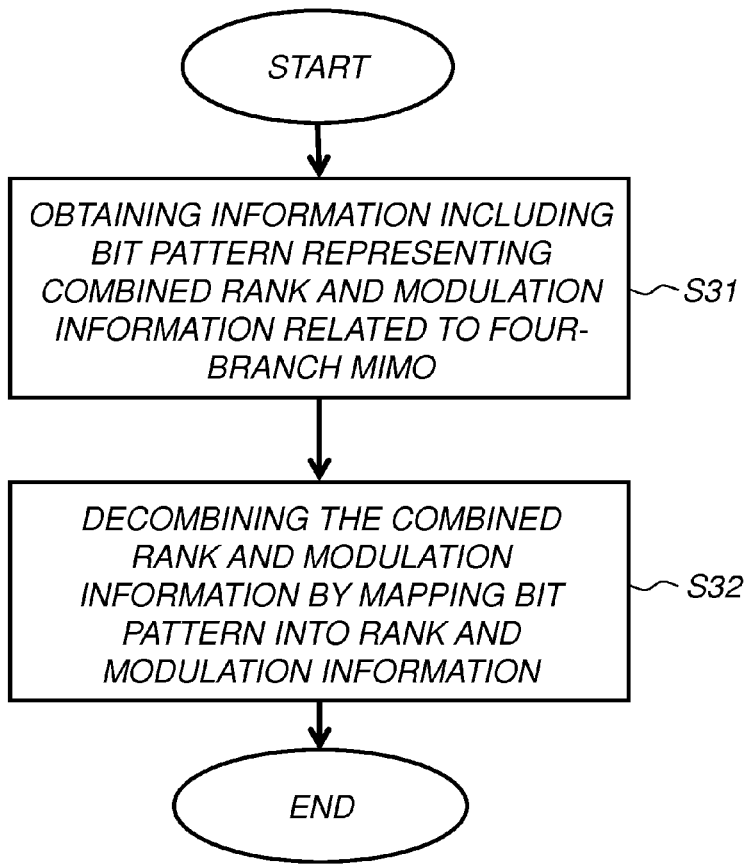
FIG. 21 is a schematic flow diagram illustrating an example of a method of processing information of a control channel in a High Speed Packet Access, HSPA, system according to an embodiment.

FIG. 21 is a schematic flow diagram illustrating an example of a method of processing information of a control channel in a High Speed Packet Access, HSPA, system according to an embodiment. The method comprises the step (S31) of obtaining information from the control channel including a bit pattern representing combined rank information and modulation information related to a four-branch Multiple Input Multiple Output, MIMO, system. The method also comprises the step (S32) of decombining the combined rank information and modulation information related to the four-branch MIMO system by mapping the bit pattern into rank information and modulation information.

By way of example, the bit mapping table illustrated in Table 1 above may be used to map the bit pattern into rank information and modulation information.

Expressed somewhat differently, in order to mitigate at least some of the drawbacks as discussed in the background section, there is provided in a first aspect a method for improving performance of downlink data transmission in a mobile communication system. The method comprises obtaining information for a control channel, arranging this information and transmitting the information in the control channel to a UE.

In a second aspect there is provided a method for improving performance of downlink data transmission in a mobile communication system. The method comprises receiving information in a control channel, processing this information and, at least partly depending on outcome of the processing, preparing for decoding (also including demodulation) of data to be received in a corresponding downlink data channel.

The control channel can be, e.g. a HS-SCCH in a HSPA system, the information can comprise rank information and modulation information. The arranging and processing of the information can comprise combining and decombining, respectively, the rank information and the modulation information. The information can relate to a four-branch MIMO system.

In further aspects there are provided a node and a UE comprising processing and communication circuitry configured to perform such methods.

In other words, examples of a method are proposed that can report control channel information in a 4-way transmit antenna wireless communication system. It is to be noted that the four-branch MIMO can be applied to a single downlink carrier.

This is advantageous, for example, in that it provides an efficient design of HS-SCCH that minimizes the capacity (throughput) loss. That is, the fact that such a design requires less number of bits implies less amount of power for control channel and hence more throughput.

It will be appreciated that the methods described above can be combined and re-arranged in a variety of ways, and that the methods can be performed by processing circuitry such as specially configured electronic circuits, e.g. discrete logic gates interconnected to perform a specialized function, or application-specific integrated circuits and/or one or more suitably programmed processors.

Many aspects of the proposed technology are described in terms of sequences of actions that can be performed by, for example, elements of a programmable computer system.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any device or unit in which the present technology is implemented, such as a base station, network controller or scheduling node. It may also be possible to re-use existing software, e.g. by reprogramming of the existing software or by adding new software components.

Figure 8:
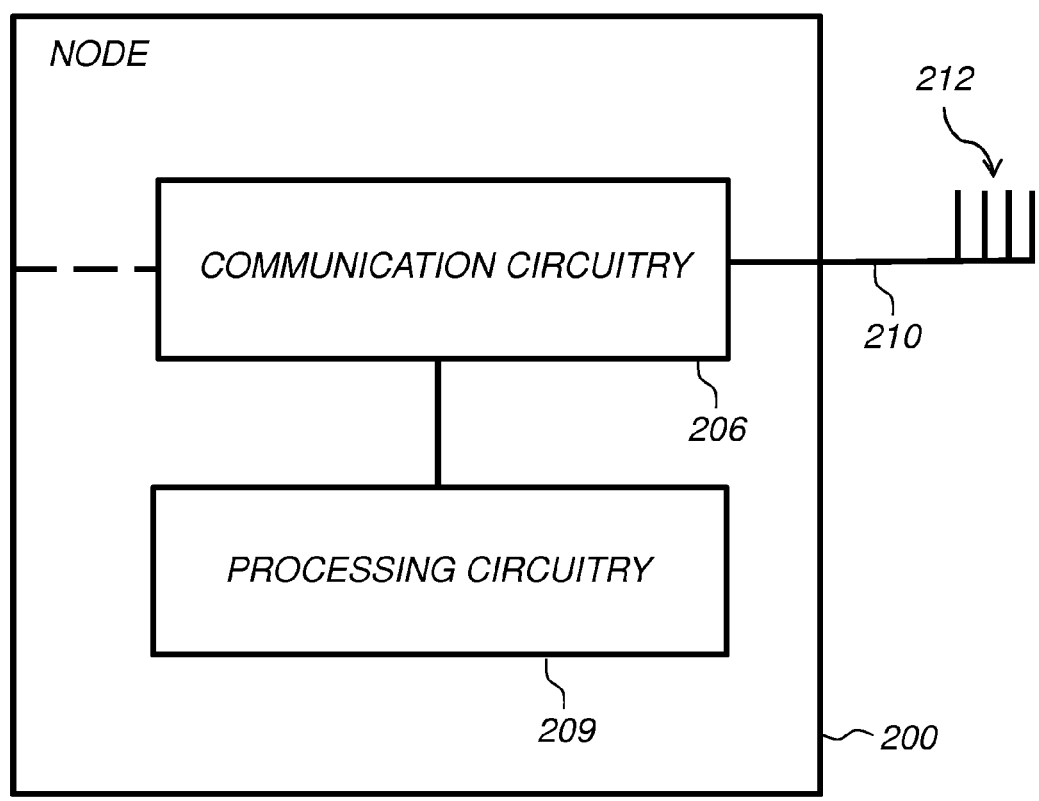
FIG. 8 is a schematic block diagram illustrating an example of a node for conveying information to user equipment, UE, in a HSPA system according to an embodiment.

FIG. 8 is a schematic block diagram illustrating an example of a node configured for conveying information to user equipment, UE, in a HSPA system according to an embodiment. The node 200 basically comprises communication circuitry 206, processing circuitry 209 and multiple antennas 212 connected to the communication circuitry 206 via a conventional data path 210. The communication circuitry 206 and the processing circuitry 209 are interconnected by conventional means. The antennas 212 may be regarded as part of an overall communication circuitry 206, 212.

The processing circuitry 209 is configured to obtain rank information and modulation information related to a four-branch Multiple Input Multiple Output, MIMO, system. The rank information and modulation information may be determined by the node based on suitable input and/or at least partly signaled from another node or UE to the node 200. The processing circuitry 209 is also configured to combine the rank information and the modulation information related to the four-branch MIMO system into a bit pattern. The communication circuitry 206, 212 is configured to transmit the combined rank and modulation information related to the four-branch MIMO system as said bit pattern in a control channel to the UE.

By way of example, the communication circuitry 206, 212 is configured to transmit the combined rank and modulation information related to the four-branch MIMO system in a High Speed Shared Control Channel, HS-SCCH.

Preferably, as previously defined, the processing circuitry 209 is configured to obtain rank information representative of the number of transport blocks to be simultaneously transmitted on the data channel associated with the control channel.

The node 200 is preferably configured to combine and report the rank information and modulation information related to the four-branch MIMO system to the UE in one information field in the control channel.

In a preferred example, the processing circuitry 209 is configured to map the rank information and the modulation information related to the four-branch MIMO system into a bit pattern of 5 bits.

By way of example, the processing circuitry 209 may be configured to map the rank information and the modulation information related to the four-branch MIMO system into a bit pattern according to the bit mapping shown in Table 1.

Figure 9:
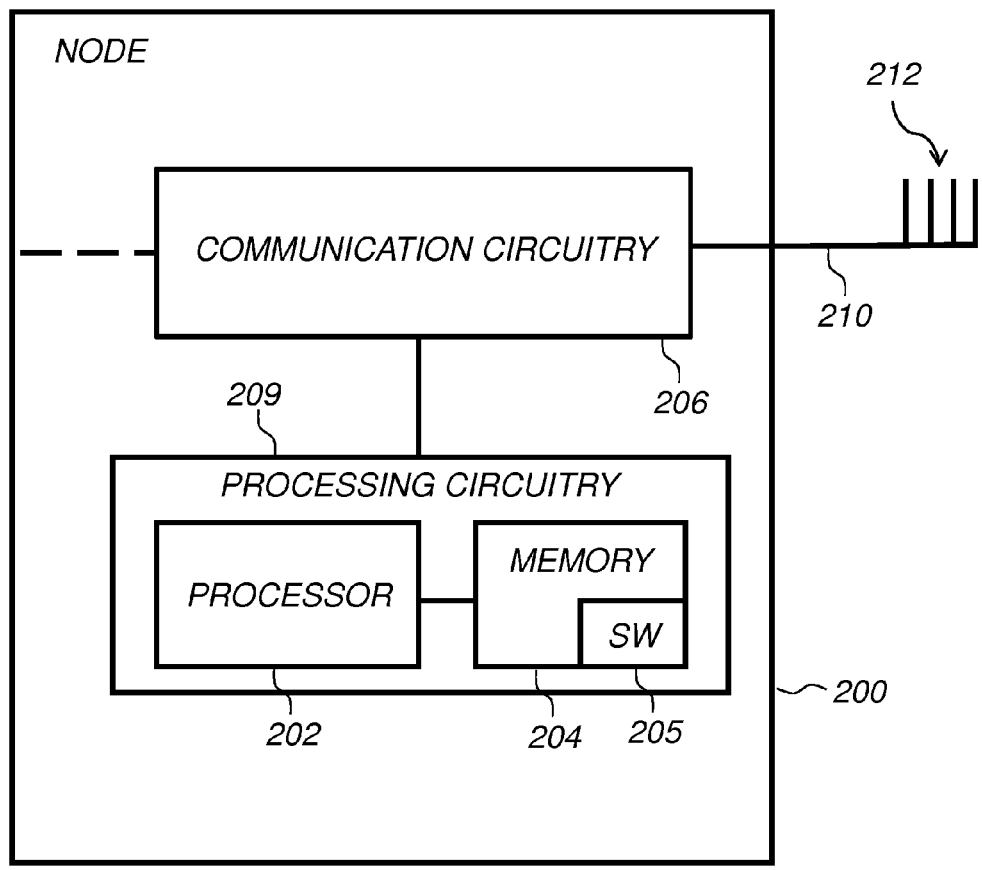
FIG. 9 is a schematic block diagram illustrating an example of a node for conveying information to user equipment, UE, in a HSPA system according to a particular embodiment.

FIG. 9 is a schematic block diagram illustrating an example of a node for conveying information to user equipment, UE, in a HSPA system according to a particular embodiment. In this particular example, the processing circuitry 209 comprises a processor 202 and an associated memory 204 connected to the processor 202. The memory 204 includes software 205 for performing, when executed by the processor 202, the processing steps described above for the node side.

Figure 10:
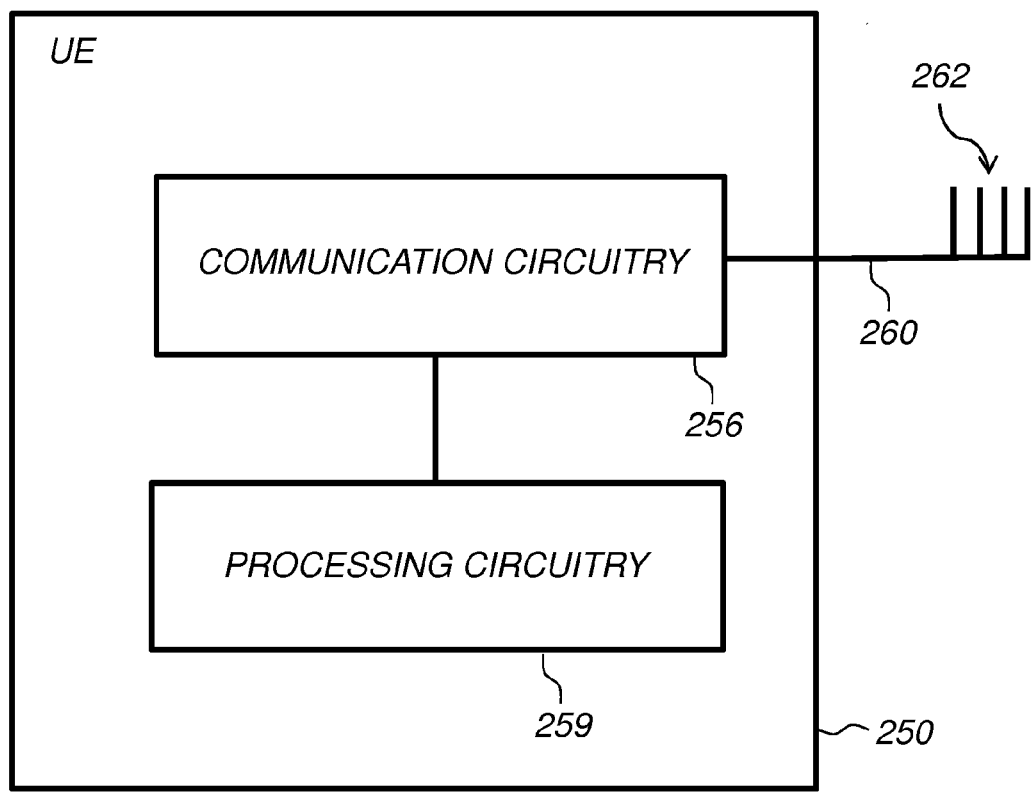
FIG. 10 is a schematic block diagram illustrating an example of user equipment, UE, for receiving and processing information from a node in a HSPA system according to an embodiment.

FIG. 10 is a schematic block diagram illustrating an example of user equipment, UE, configured for receiving and processing information from a node in a HSPA system according to an embodiment. The UE 250 basically comprises communication circuitry 256, processing circuitry 259 and multiple antennas 262 connected to the communication circuitry 256 via a conventional data path 260. The communication circuitry 256 and the processing circuitry 259 are interconnected by conventional means. The antennas 262 may be regarded as part of an overall communication circuitry 256, 262.

The communication circuitry 256, 262 is configured to receive, in a control channel from the node, information including a bit pattern representing combined rank information and modulation information related to a four-branch Multiple Input Multiple Output, MIMO, system. The processing circuitry 259 is configured to process the received information including decombining the combined rank information and modulation information related to the four-branch MIMO system.

By way of example, the communication circuitry 256, 262 is configured to receive the information including a bit pattern representing combined rank information and modulation information in a High Speed Shared Control Channel, HS-SCCH.

The rank information is representative of the number of transport blocks to be simultaneously transmitted on the data channel associated with the control channel.

The processing circuitry 259 is preferably configured to decombine the combined rank information and modulation information in order to be prepared for decoding of data to be received on the data channel associated with the control channel.

In a preferred example, the received bit pattern representing combined rank information and modulation information related to the four-branch MIMO system is a bit pattern of 5 bits.

By way of example, the processing circuitry 259 may be configured to map the bit pattern into rank information and modulation information according to the bit mapping shown in Table 1.

Figure 11:
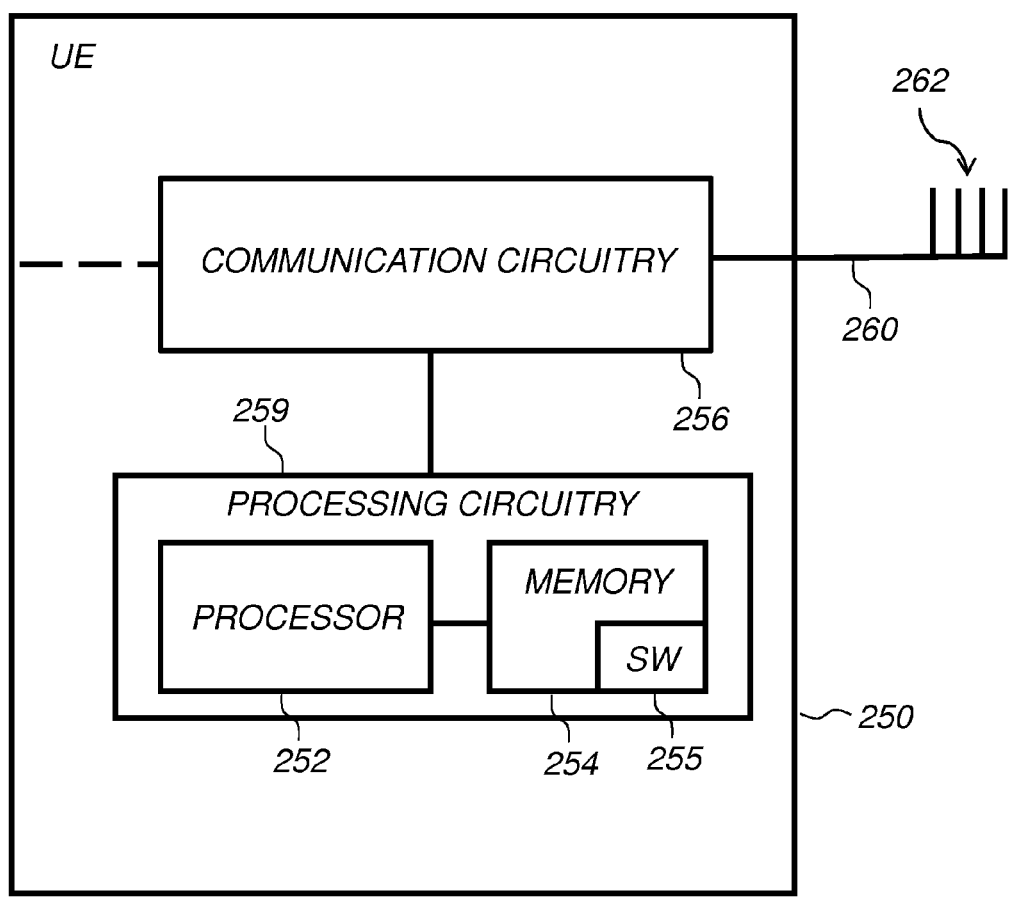
FIG. 11 is a schematic block diagram illustrating an example of user equipment, UE, for receiving and processing information from a node in a HSPA system according to a particular embodiment.

FIG. 11 is a schematic block diagram illustrating an example of user equipment, UE, for receiving and processing information from a node in a HSPA system according to a particular embodiment. In this particular example, the processing circuitry 259 comprises a processor 252 and an associated memory 254 connected to the processor 252. The memory 254 includes software 255 for performing, when executed by the processor 252, the processing steps described above for the UE side.

Figure 12:
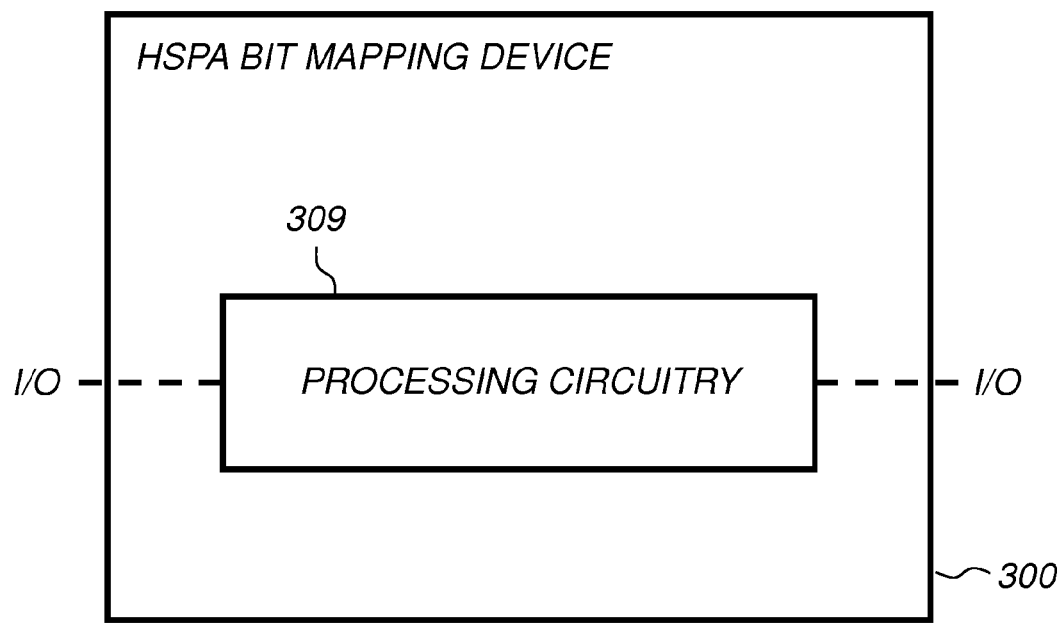
FIG. 12 is a schematic block diagram illustrating an example of a bit mapping device for information for a control channel in a HSPA system according to an embodiment.

FIG. 12 is a schematic block diagram illustrating an example of a bit mapping device for information for a control channel in a HSPA system according to an embodiment. The HSPA bit mapping device 300 basically comprises processing circuitry 309 configured to obtain rank information and modulation information related to a four-branch Multiple Input Multiple Output, MIMO, system. The processing circuitry 309 is also configured to combine the rank information and the modulation information related to the four-branch MIMO system into a bit pattern for the control channel.

By way of example, the processing circuitry 309 is configured to combine the rank information and the modulation information related to the four-branch MIMO system into the bit pattern for a High Speed Shared Control Channel, HS-SCCH.

Preferably, the processing circuitry 309 is configured to obtain rank information representative of the number of transport blocks to be simultaneously transmitted on the data channel associated with the control channel.

In a preferred example, the processing circuitry 309 is configured to map the rank information and the modulation information related to the four-branch MIMO system into a bit pattern of 5 bits.

By way of example, the processing circuitry 309 is configured to map the rank information and the modulation information related to the four-branch MIMO system into a bit pattern according to the bit mapping shown in Table 1.

The processing circuitry 309 may comprise one or more Input/Output (I/O) interfaces for obtaining the rank information and modulation information, and for outputting the bit pattern.

Figure 13:
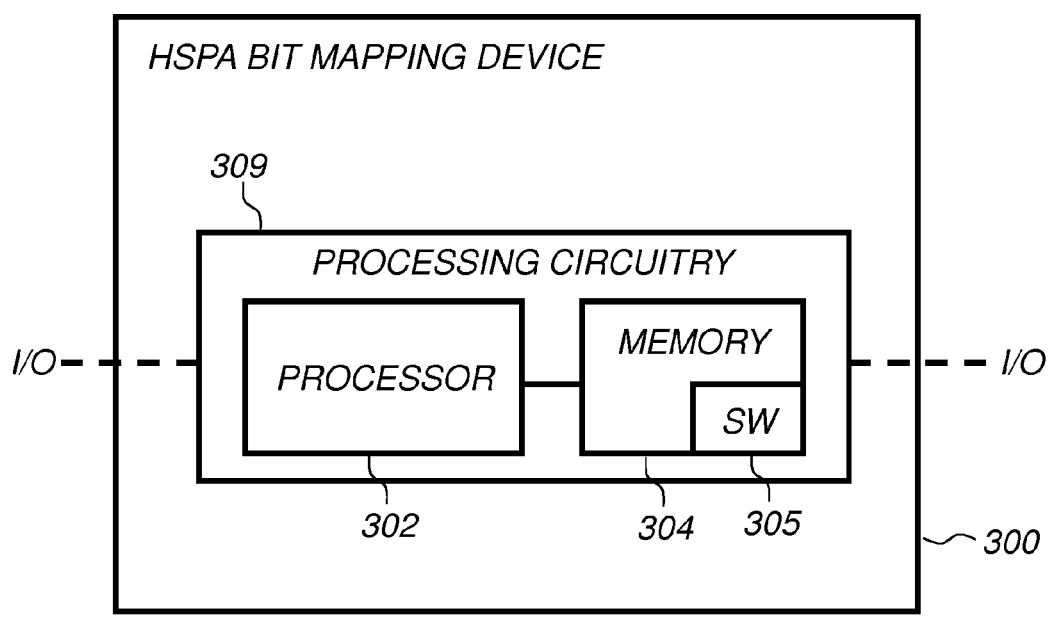
FIG. 13 is a schematic block diagram illustrating an example of a bit mapping device for information for a control channel in a HSPA system according to a particular embodiment.

FIG. 13 is a schematic block diagram illustrating an example of a bit mapping device for information for a control channel in a HSPA system according to a particular embodiment. In this particular example, the processing circuitry 309 comprises a processor 302 and an associated memory 304 connected to the processor 302. The memory 304 includes software 305 for performing, when executed by the processor 302, the processing steps for effectuating the bit mapping.

Figure 14:
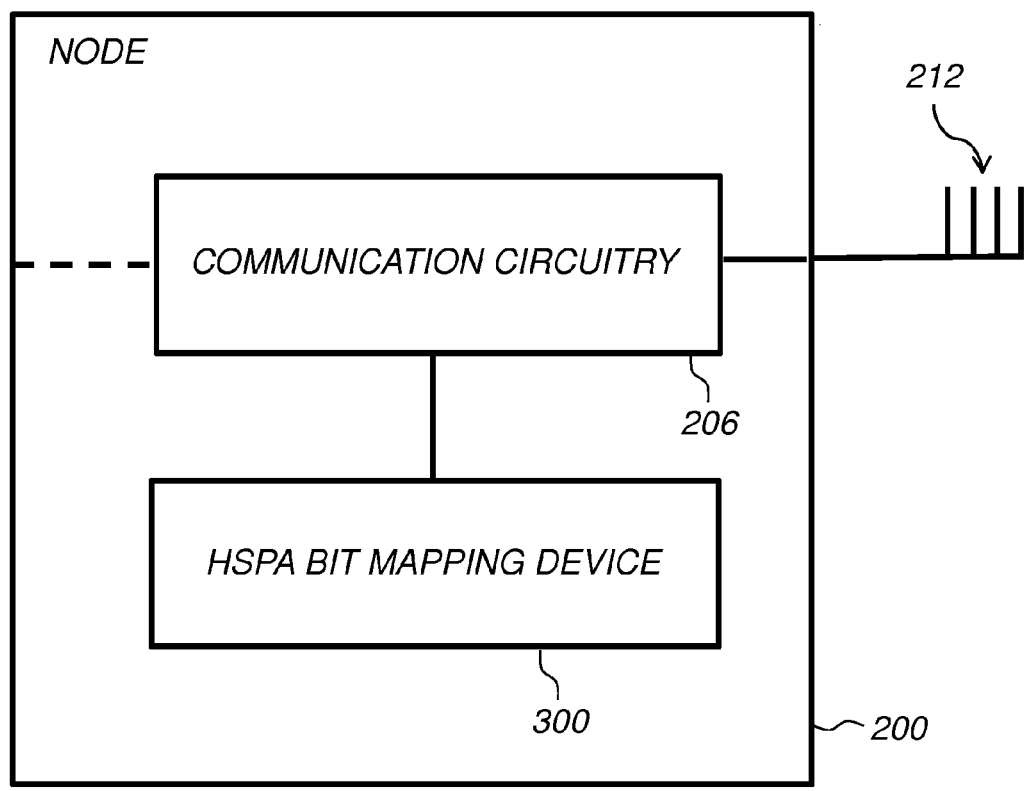
FIG. 14 is a schematic block diagram illustrating an example of a node in which a HSPA bit mapping device of FIG. 12

FIG. 14 is a schematic block diagram illustrating an example of a node in which a HSPA bit mapping device of FIG. 12 or FIG. 13 is implemented. Basically, the node 200 comprises communication circuitry 206, 212 for incoming and outgoing communication and a HSPA bit mapping device 300 connected to the communication circuitry 206.

Figure 22:
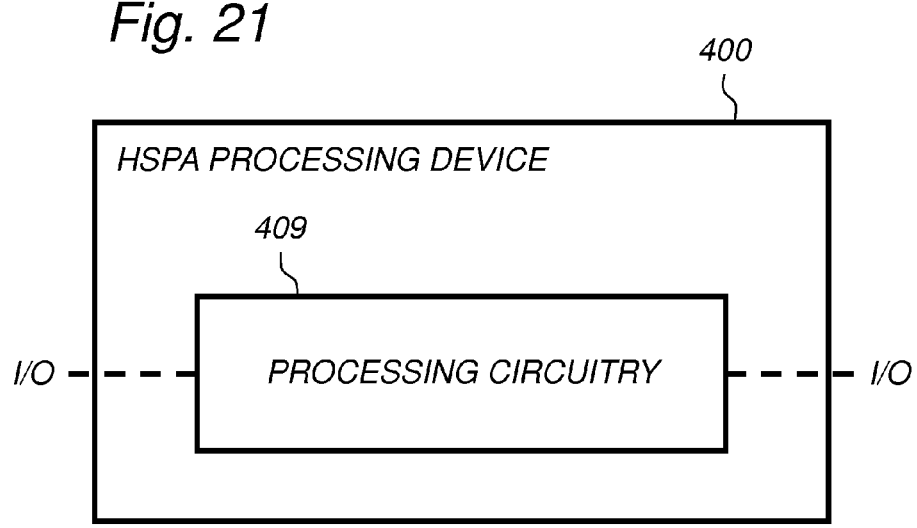
FIG. 22 is a schematic block diagram illustrating an example of a device for processing information of a control channel in a High Speed Packet Access, HSPA, system according to an embodiment.

FIG. 22 is a schematic block diagram illustrating an example of a device for processing information of a control channel in a High Speed Packet Access, HSPA, system according to an embodiment. The device 400 comprises processing circuitry 409 configured to obtain information from the control channel including a bit pattern representing combined rank information and modulation information related to a four-branch Multiple Input Multiple Output, MIMO, system. The processing circuitry 409 is also configured to decombine the combined rank information and modulation information related to the four-branch MIMO system by mapping the bit pattern into rank information and modulation information.

By way of example, the processing circuitry 409 may be configured to map the bit pattern into rank information and modulation information according to the bit mapping shown in Table 1.

The processing circuitry 409 may comprise one or more I/O-interfaces for obtaining information from the control channel such as the bit pattern and for outputting the rank information and modulation information.

It may be useful to describe the proposed technology with respect to particular examples in the overall context of messages exchanged between NodeB and a user equipment, UE, during typical data call set up in a high speed downlink packet access, HSDPA, system.

Figure 15A:
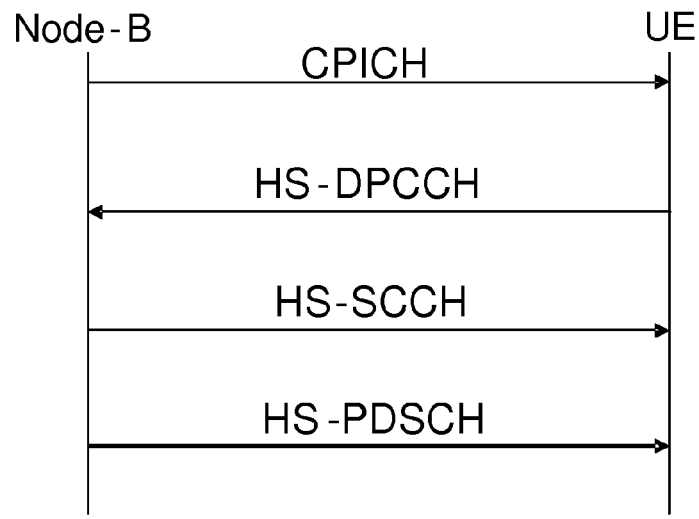
FIG. 15A is a schematic signaling diagram illustrating an example of signaling between a Node-B and a UE in a HSPA system.

FIG. 15A shows an example of the messages exchanged between NodeB and a user equipment, UE, during typical data call set up in a high speed downlink packet access, HSDPA, system. From the common pilot channel, CPICH, UE estimates the channel and computes the channel quality information and pre-coding channel indicator. This information along with hybrid automatic repeat request, HARQ, acknowledgement/negative acknowledgement, ACK/NAK, is reported to NodeB using high speed dedicated physical control channel, HS-DPCCH. The minimum periodicity of HS-DPCCH is one subframe (2 msec). A NodeB scheduler decides the parameters including modulation and code rate (transport block size), pre-coding index and rank information for the data transmission on the high speed physical downlink shared channel, HS-PDSCH. This information is sent through the high speed shared control channel, HS-SCCH. After HS-SCCH, the high speed physical downlink shared channel, HS-PDSCH, is transmitted.

Figure 15B:
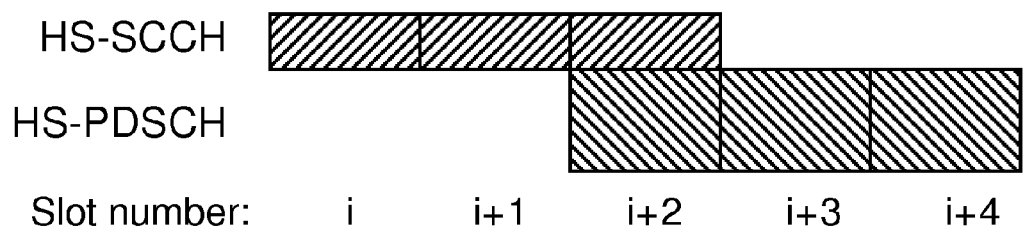
FIG. 15B is a schematic diagram that illustrates schematically an example of the timing for channel transmission.

Due to the scheduled nature of the HS-PDSCH, the control signaling is not needed all the time for a particular user. For downlink, where the number of channelization codes is limited, it becomes beneficial to designate only a few control channels to be shared among the users. A HS-SCCH is assigned to a user only when the user is scheduled. In order to provide the user with all the necessary information such as rank, modulation, channelization codes, the HS-SCCH is staggered with HS-PDSCH as shown in FIG. 15B, where the HS-SCCH is sent 2 slots ahead of HS-PDSCH. Through successful decoding of the UE identification field, the intended user is informed of the upcoming HS-PDSCH. This user then decodes the rest of the HS-SCCH to obtain the necessary information and be prepared for the decoding of HS-PDSCH.

Figure 16:
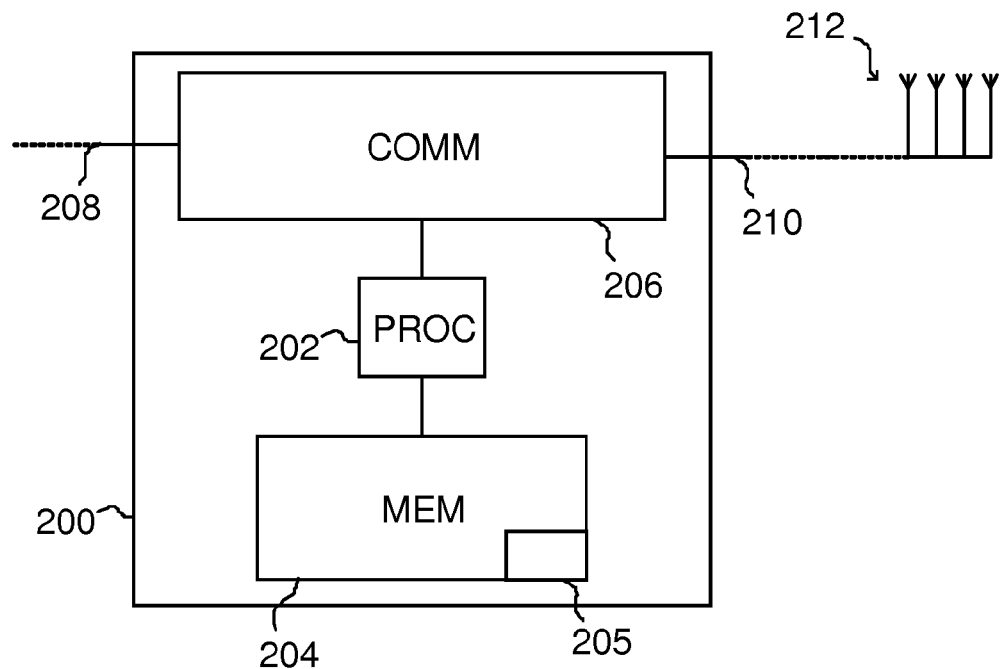
FIG. 16 is a schematic block diagram that illustrates schematically an example of a node in a mobile communication system.

FIG. 16 is a functional block diagram that schematically illustrates a node 200 that is configured to operate in a radio access network, such as the UTRAN 103 in FIG. 1. In the embodiment of FIG. 16, the node 200 represents a NodeB, such as any of the NodeBs 104 in FIG. 1.

The node 200 comprises processing means, memory means and communication means in the form of a processor 202, a memory 204 and communication circuitry 206. The node 200 communicates with other nodes via a first data path 208 and via a second data path 210. For example, the first data path 208 can be connected to a RNC and the second data path 210 can be connected to one or more antennas 212. The data paths 208, 210 can be any of uplink and downlink data paths, as the skilled person will realize.

Figure 17:
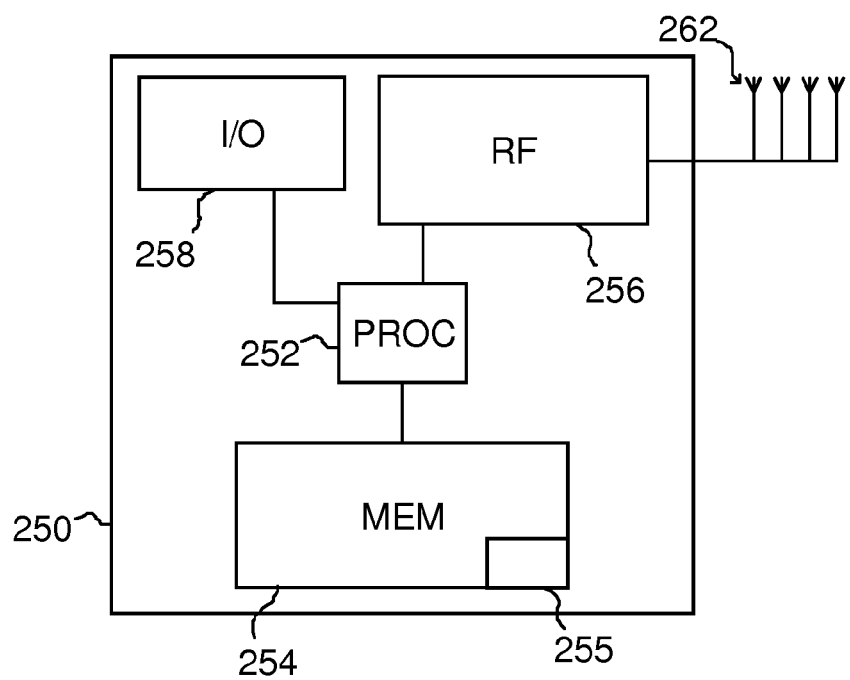
FIG. 17 is a schematic block diagram that illustrates schematically an example of a UE.

FIG. 17 is a functional block diagram that schematically illustrates a UE 250 that is configured to operate in a radio access network, such as the UTRAN 103 in FIG. 1. In the embodiment of FIG. 17, the UE 250 can be any of the UEs 106 in FIG. 1.

The UE 250 comprises processing means, memory means and communication means in the form of a processor 252, a memory 254 and radio circuitry 256. The UE 250 communicates with other nodes via a radio air interface with the use of one or more antennas 262. The UE 250 also comprises input/output circuitry 258 in the form of, e.g., a display, a keypad, a microphone, a camera etc.

The methods to be described below can be implemented in the node 200 and the UE 250. In such embodiments, the method actions are realized by means of software instructions 205, 255 that are stored in the memory 204, 254 and are executable by the processor 202, 252. Such software instructions 205, 255 can be realized and provided in any suitable way, e.g. provided via the networks 102, 103 or being installed during manufacturing, as the skilled person will realize. Moreover, the memory 204, 254, the processor 202, 252, as well as the communication circuitry 206 and radio circuitry 256 comprise software and/or firmware that, in addition to being configured such that it is capable of implementing the methods to be described, is configured to control the general operation of the node 200 and the UE 250, respectively, when operating in a cellular mobile communication system such as the system 100 in FIG. 1. However, for the purpose of avoiding unnecessary detail, no further description will be made in the present disclosure regarding this general operation.

Turning now to a discussion of HSPA communication between a NodeB and a UE, such as any of the NodeBs 104, 200 and UEs 106, 250 in FIG. 1, including transmission in a HS-SCCH and a HS-PDSCH.

For a two-branch MIMO system, also commonly referred to as dual-stream MIMO, the HS-SCCH carries information about channelization code set, CCS, modulation and transport block information etc. Since the UE needs information about the channelization code set and modulation, pre-coding for setting up the weights for HS-PDSCH, the HS-SCCH is divided to two parts (part I and part II).

Part I consists of 12 bits, which conveys information about channelization code set (7 bits), modulation (3 bits), and PCI (2 bits). Rank information, RI, is implicitly informed through modulation bits. That is, in summary:
Part I (Total of 12 bits):
channelization code set (7 bits),
modulation and Rank (3 bits),
pre-coding information (2 bits)

Part II consists of 36 bits. Out of which 6 bits for each transport block 4 bits for HARQ process, 4 bits for redundancy version for the two streams and 16 bits for the identity, ID, of the UE. For single stream transmission, only 28 bits are needed for part II. That is, in summary:
Part II (Total of 28 or 36 bits):
For single stream transmission NodeB conveys 28 bits:
Transport block size (6 bits)

HARQ process (4 bits),
redundancy version (2 bits),
UE ID (16 bits)
For dual stream transmission NodeB conveys 36 bits:
Transport block size -1 (6 bits)
Transport block size -2 (6 bits)
HARQ process (4 bits),
Redundancy version -1 (2 bits),
Redundancy version -2 (2 bits),
UE ID (16 bits)

Similar to a two-branch MIMO, a four-branch MIMO system HS-SCCH structure consist of two parts. Since it has been decided to use two code words, it is not anticipated any change in the part II structure.

For part I structure the following has to be informed:
CCS (7 bits)
Rank information—requires 2 bits
Modulation per each code word (2+2=4 bits)
PCI (4 bits)

Hence in general there is a need for 7+2+2*2+4=17 bits in such a direct approach. It is to be noted that in the direct approach, rank information and modulation information are reported independently. In the NodeB, the rank information and modulation information are initially maintained as two independent information entities, as previously explained.

Figure 19:
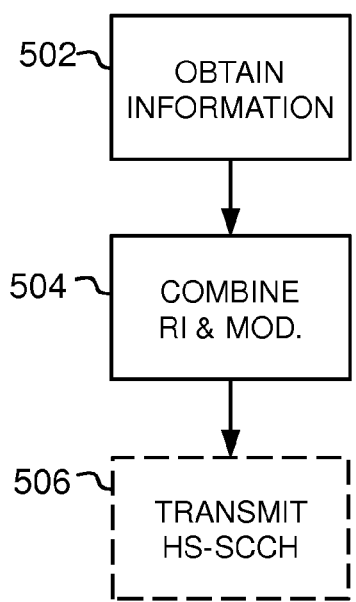
FIG. 19 is a schematic flowchart illustrating an example of a method in a node.

In a proposed approach, rank information and information about modulation are coupled for each HARQ process so that the number of reported bits is reduced; keeping in mind that the proposed approach is also applicable when there is no HARQ. An example of this approach is illustrated in a flow chart in FIG. 19. An obtaining step 502 comprises obtaining rank information and information about modulation, a combining step 504 comprises combining the rank information and information about modulation into a bit pattern and a transmission step 506 comprises transmitting the combined rank and modulation information in a control channel such as HS-SCCH.

Figure 20:
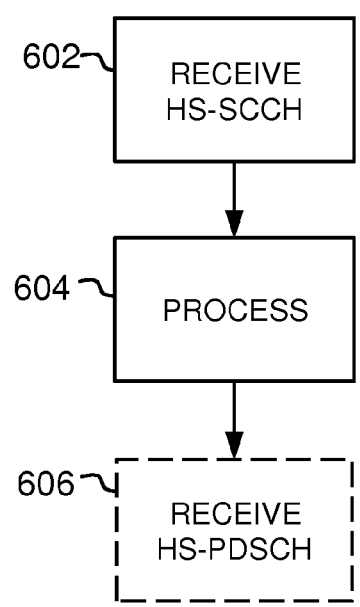
FIG. 20 is a schematic flowchart illustrating an example of a method in a UE.

A corresponding method in a UE is illustrated in the flow chart of FIG. 20. The method comprises, in a reception step 602, receiving rank and modulation information in a control channel such as HS-SCCH. Processing of this information takes place in a processing step 604 where the received information is de-combined. Finally, data is then received in a reception step 606 in a corresponding data channel such as HS-PDSCH downlink channel.

Figure 18:
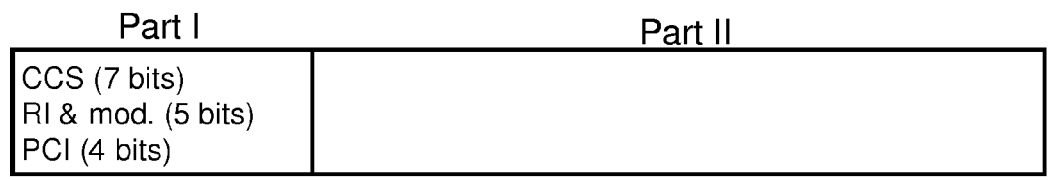
FIG. 18 is a schematic diagram that illustrates schematically an example of the contents of a signaling channel divided into two parts.

In other words, in the proposed approach, a NodeB reports the combined rank and modulation information to the UE, and instead of reporting rank information and modulation separately, the rank information and the modulation reporting are combined into one field so that total number of bits is reduced. That is, with reference to FIG. 18:
CCS (7 bits)
Rank information +modulation per 2 code words (5 bits)
PCI (4 bits)

The previously presented Table 1 shows one bit mapping example for such an approach. In total, 16 bits are needed and the power can be reduced by up to as much as 0.35 dB in comparison with the direct approach where 17 bits are reported. This will have a considerable effect on user throughput as well as system throughput in the HSPA system.

The embodiments described above are merely given as examples, and it should be understood that the proposed technology is not limited thereto. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for conveying information from a node to user equipment (UE) in a High Speed Packet Access (HSPA) system, said method comprising:
   obtaining rank information and modulation information related to a four-branch Multiple Input Multiple Output (MIMO) system, wherein the rank information indicates a number of transport blocks, from one to four, to be simultaneously transmitted on the data channel associated with the control channel;
   combining the rank information and the modulation information related to said four-branch MIMO system into a 5-bit bit pattern, wherein the 5-bit pattern is selected from a plurality of 5-bit patterns collectively representing all combinations of modulation schemes and number of simultaneously transmitted transport blocks related to the four-branch MIMO system, each of the 5-bit patterns corresponding to only a single one of the combinations of modulation schemes and number of simultaneously transmitted transport blocks;
   transmitting the combined rank information and modulation information related to said four-branch MIMO system as said bit pattern in a control channel to the UE.

2. The method of claim 1, wherein the control channel is a High Speed Shared Control Channel (HS-SCCH) in the HSPA system.

3. The method of claim 1, wherein said rank information and modulation information related to said four-branch MIMO system are combined and reported to the UE in one information field in the control channel.

4. The method of claim 1, wherein said combining the rank information and the modulation information related to said four-branch MIMO system into a bit pattern comprises the step of mapping the rank information and the modulation information into the bit pattern according to the following bit mapping table:

| Bit Pattern | RI | Modulation-I | Modulation-II |
| --- | --- | --- | --- |
| 00000 | 1 | QPSK | NA |
| 00001 | 1 | 16 QAM | NA |
| 00010 | 1 | 64 QAM | NA |
| 00011 | 2 | QPSK | QPSK |
| 00100 | 2 | QPSK | 16 QAM |
| 00101 | 2 | QPSK | 64 QAM |
| 00110 | 2 | 16 QAM | QPSK |
| 00111 | 2 | 16 QAM | 16 QAM |
| 01000 | 2 | 16 QAM | 64 QAM |
| 01001 | 2 | 64 QAM | QPSK |
| 01010 | 2 | 64 QAM | 16 QAM |
| 01011 | 2 | 64 QAM | 64 QAM |
| 01100 | 3 | QPSK | QPSK |
| 01101 | 3 | QPSK | 16 QAM |
| 01110 | 3 | QPSK | 64 QAM |
| 01111 | 3 | 16 QAM | QPSK |
| 10000 | 3 | 16 QAM | 16 QAM |
| 10001 | 3 | 16 QAM | 64 QAM |
| 10010 | 3 | 64 QAM | QPSK |
| 10011 | 3 | 64 QAM | 16 QAM |
| 10100 | 3 | 64 QAM | 64 QAM |
| 10101 | 4 | QPSK | QPSK |
| 10110 | 4 | QPSK | 16 QAM |
| 10111 | 4 | QPSK | 64 QAM |
| 11000 | 4 | 16 QAM | QPSK |
| 11001 | 4 | 16 QAM | 16 QAM |
| 11010 | 4 | 16 QAM | 64 QAM |
| 11011 | 4 | 64 QAM | QPSK |

-continued

| Bit Pattern | RI | Modulation-I | Modulation-II |
|---|---|---|---|
| 11100 | 4 | 64 QAM | 16 QAM |
| 11101 | 4 | 64 QAM | 64 QAM |
| 11110 | NA | NA | NA |
| 11111 | NA | NA | NA | where RI denotes 'Rank Information', QPSK denotes 'Quadrature Phase Shift Keying', QAM denotes 'Quadrature Amplitude Modulation', NA denotes 'Not Applicable', and Modulation-I and Modulation-II denotes modulation for different transport blocks.

5. The method of claim 1, wherein the rank information and the modulation information are coupled for each Hybrid Automatic Repeat reQuest (HARQ) process.

6. A method of receiving and processing information from a node in a High Speed Packet Access (HSPA) system, said method comprising:
receiving, in a control channel from the node, information including a 5-bit bit pattern representing combined rank information and modulation information related to a four-branch Multiple Input Multiple Output (MIMO) system, wherein the rank information indicates a number of transport blocks, from one to four, to be simultaneously transmitted on the data channel associated with the control channel; and
processing the received information, including decombining the combined rank information and modulation information related to said four-branch MIMO system, wherein said decombining comprises mapping the 5-bit pattern into rank information and modulation according to a predefined mapping of a plurality of 5-bit patterns to all combinations of modulation schemes and number of simultaneously transmitted transport blocks related to the four-branch MIMO system, each of the 5-bit patterns corresponding to only a single one of the combinations of modulation schemes and number of simultaneously transmitted transport blocks.

7. The method of claim 6, wherein the control channel is a High Speed Shared Control Channel (HS-SCCH) in the HSPA system.

8. The method of claim 6, further comprising preparing decoding of data to be received on the data channel associated with the control channel based on the processed information.

9. The method of claim 6, wherein said processing the received information comprises mapping the bit pattern into rank information and modulation information according to the following bit mapping table:

| Bit Pattern | RI | Modulation-I | Modulation-II |
|---|---|---|---|
| 00000 | 1 | QPSK | NA |
| 00001 | 1 | 16 QAM | NA |
| 00010 | 1 | 64 QAM | NA |
| 00011 | 2 | QPSK | QPSK |
| 00100 | 2 | QPSK | 16 QAM |
| 00101 | 2 | QPSK | 64 QAM |
| 00110 | 2 | 16 QAM | QPSK |
| 00111 | 2 | 16 QAM | 16 QAM |
| 01000 | 2 | 16 QAM | 64 QAM |
| 01001 | 2 | 64 QAM | QPSK |
| 01010 | 2 | 64 QAM | 16 QAM |
| 01011 | 2 | 64 QAM | 64 QAM |
| 01100 | 3 | QPSK | QPSK |
| 01101 | 3 | QPSK | 16 QAM |
| 01110 | 3 | QPSK | 64 QAM |
| 01111 | 3 | 16 QAM | QPSK |
| 10000 | 3 | 16 QAM | 16 QAM |
| 10001 | 3 | 16 QAM | 64 QAM |
| 10010 | 3 | 64 QAM | QPSK |
| 10011 | 3 | 64 QAM | 16 QAM |
| 10100 | 3 | 64 QAM | 64 QAM |
| 10101 | 4 | QPSK | QPSK |
| 10110 | 4 | QPSK | 16 QAM |
| 10111 | 4 | QPSK | 64 QAM |
| 11000 | 4 | 16 QAM | QPSK |
| 11001 | 4 | 16 QAM | 16 QAM |
| 11010 | 4 | 16 QAM | 64 QAM |
| 11011 | 4 | 64 QAM | QPSK |
| 11100 | 4 | 64 QAM | 16 QAM |
| 11101 | 4 | 64 QAM | 64 QAM |
| 11110 | NA | NA | NA |
| 11111 | NA | NA | NA | where RI denotes 'Rank Information', QPSK denotes 'Quadrature Phase Shift Keying', QAM denotes 'Quadrature Amplitude Modulation', NA denotes 'Not Applicable', and Modulation-I and Modulation-II denotes modulation for different transport blocks.

10. A node configured to convey information to user equipment (UE) in a High Speed Packet Access (HSPA) system, said node comprising:
processing circuitry configured to obtain rank information and modulation information related to a four-branch Multiple Input Multiple Output (MIMO) system, wherein the rank information indicates a number of transport blocks, from one to four, to be simultaneously transmitted on the data channel associated with the control channel;
wherein said processing circuitry is also configured to combine the rank information and the modulation information related to said four-branch MIMO system into a 5-bit bit pattern, wherein the 5-bit pattern is selected from a plurality of 5-bit patterns collectively representing all combinations of modulation schemes and number of simultaneously transmitted transport blocks related to the four-branch MIMO system, each of the 5-bit patterns corresponding to only a single one of the combinations of modulation schemes and number of simultaneously transmitted transport blocks; and
communication circuitry configured to transmit the combined rank and modulation information related to said four-branch MIMO system as said bit pattern in a control channel to the UE.

11. The node of claim 10, wherein said communication circuitry is configured to transmit the combined rank and modulation information related to said four-branch MIMO system in a High Speed Shared Control Channel (HS-SCCH).

12. The node of claim 10, wherein said node is configured to combine and report said rank information and modulation information related to said four-branch MIMO system to the UE in one information field in the control channel.

13. The node of claim 10, wherein said processing circuitry is configured to map the rank information and the modulation information related to said four-branch MIMO system into a bit pattern according to the following bit mapping table:

| Bit Pattern | RI | Modulation-I | Modulation-II |
|---|---|---|---|
| 00000 | 1 | QPSK | NA |
| 00001 | 1 | 16 QAM | NA |
| 00010 | 1 | 64 QAM | NA |
| 00011 | 2 | QPSK | QPSK |
| 00100 | 2 | QPSK | 16 QAM |
| 00101 | 2 | QPSK | 64 QAM |
| 00110 | 2 | 16 QAM | QPSK |

-continued

| Bit Pattern | RI | Modulation-I | Modulation-II |
|---|---|---|---|
| 00111 | 2 | 16 QAM | 16 QAM |
| 01000 | 2 | 16 QAM | 64 QAM |
| 01001 | 2 | 64 QAM | QPSK |
| 01010 | 2 | 64 QAM | 16 QAM |
| 01011 | 2 | 64 QAM | 64 QAM |
| 01100 | 3 | QPSK | QPSK |
| 01101 | 3 | QPSK | 16 QAM |
| 01110 | 3 | QPSK | 64 QAM |
| 01111 | 3 | 16 QAM | QPSK |
| 10000 | 3 | 16 QAM | 16 QAM |
| 10001 | 3 | 16 QAM | 64 QAM |
| 10010 | 3 | 64 QAM | QPSK |
| 10011 | 3 | 64 QAM | 16 QAM |
| 10100 | 3 | 64 QAM | 64 QAM |
| 10101 | 4 | QPSK | QPSK |
| 10110 | 4 | QPSK | 16 QAM |
| 10111 | 4 | QPSK | 64 QAM |
| 11000 | 4 | 16 QAM | QPSK |
| 11001 | 4 | 16 QAM | 16 QAM |
| 11010 | 4 | 16 QAM | 64 QAM |
| 11011 | 4 | 64 QAM | QPSK |
| 11100 | 4 | 64 QAM | 16 QAM |
| 11101 | 4 | 64 QAM | 64 QAM |
| 11110 | NA | NA | NA |
| 11111 | NA | NA | NA | where RI denotes 'Rank Information', QPSK denotes 'Quadrature Phase Shift Keying', QAM denotes 'Quadrature Amplitude Modulation', NA denotes 'Not Applicable', and Modulation-I and Modulation-II denotes modulation for different transport blocks.

14. The node of claim 10, wherein said node is a NodeB.

15. User equipment (UE) configured for receiving and processing information from a node in a High Speed Packet Access (HSPA) system, said UE comprising:

communication circuitry configured to receive, in a control channel from the node, information including a 5-bit bit pattern representing combined rank information and modulation information related to a four-branch Multiple Input Multiple Output (MIMO) system, wherein the rank information indicates a number of transport blocks, from one to four, to be simultaneously transmitted on the data channel associated with the control channel; and processing circuitry configured to process the received information including decombining the combined rank information and modulation information related to said four-branch MIMO system, wherein said decombining comprises mapping the 5-bit pattern into rank information and modulation information according to a predefined mapping of a plurality of 5-bit patterns to all combinations of modulation schemes and number of simultaneously transmitted transport blocks related to the four-branch MIMO system, each of the 5-bit patterns corresponding to only a single one of the combinations of modulation schemes and number of simultaneously transmitted transport blocks.

16. The UE of claim 15, wherein said communication circuitry is configured to receive said information in a High Speed Shared Control Channel (HS-SCCH).

17. The UE of claim 15, wherein said processing circuitry is configured to decombine said combined rank information and modulation information to be prepared for decoding of data to be received on the data channel associated with the control channel.

18. The UE of claim 15, wherein said processing circuitry is configured to map the bit pattern into rank information and modulation information according to the following bit mapping table:

| Bit Pattern | RI | Modulation-I | Modulation-II |
|---|---|---|---|
| 00000 | 1 | QPSK | NA |
| 00001 | 1 | 16 QAM | NA |
| 00010 | 1 | 64 QAM | NA |
| 00011 | 2 | QPSK | QPSK |
| 00100 | 2 | QPSK | 16 QAM |
| 00101 | 2 | QPSK | 64 QAM |
| 00110 | 2 | 16 QAM | QPSK |
| 00111 | 2 | 16 QAM | 16 QAM |
| 01000 | 2 | 16 QAM | 64 QAM |
| 01001 | 2 | 64 QAM | QPSK |
| 01010 | 2 | 64 QAM | 16 QAM |
| 01011 | 2 | 64 QAM | 64 QAM |
| 01100 | 3 | QPSK | QPSK |
| 01101 | 3 | QPSK | 16 QAM |
| 01110 | 3 | QPSK | 64 QAM |
| 01111 | 3 | 16 QAM | QPSK |
| 10000 | 3 | 16 QAM | 16 QAM |
| 10001 | 3 | 16 QAM | 64 QAM |
| 10010 | 3 | 64 QAM | QPSK |
| 10011 | 3 | 64 QAM | 16 QAM |
| 10100 | 3 | 64 QAM | 64 QAM |
| 10101 | 4 | QPSK | QPSK |
| 10110 | 4 | QPSK | 16 QAM |
| 10111 | 4 | QPSK | 64 QAM |
| 11000 | 4 | 16 QAM | QPSK |
| 11001 | 4 | 16 QAM | 16 QAM |
| 11010 | 4 | 16 QAM | 64 QAM |
| 11011 | 4 | 64 QAM | QPSK |
| 11100 | 4 | 64 QAM | 16 QAM |
| 11101 | 4 | 64 QAM | 64 QAM |
| 11110 | NA | NA | NA |
| 11111 | NA | NA | NA | where RI denotes 'Rank Information', QPSK denotes 'Quadrature Phase Shift Keying', QAM denotes 'Quadrature Amplitude Modulation', NA denotes 'Not Applicable', and Modulation-I and Modulation-II denotes modulation for different transport blocks.

19. A method of processing information of a control channel in a High Speed Packet Access (HSPA) system, wherein said method comprises:

obtaining information from said control channel including a 5-bit bit pattern representing combined rank information and modulation information related to a four-branch Multiple Input Multiple Output (MIMO) system, wherein the rank information indicates a number of transport blocks, from one to four, to be simultaneously transmitted on the data channel associated with the control channel;

decombining the combined rank information and modulation information related to said four-branch MIMO system by mapping the bit pattern into rank information and modulation information according to a predefined mapping of a plurality of 5-bit patterns to all combinations of modulation schemes and number of simultaneously transmitted transport blocks related to the four-branch MIMO system, each of the 5-bit patterns corresponding to only a single one of the combinations of modulation schemes and number of simultaneously transmitted transport blocks.

20. A method for conveying information from a node to user equipment (UE) in a High Speed Packet Access (HSPA) system, said method comprising:

obtaining rank information and modulation information related to a four-branch Multiple Input Multiple Output (MIMO) system, wherein the rank information indicates a number of transport blocks, from one to four, to be simultaneously transmitted on the data channel associated with the control channel;

combining the rank information and the modulation information related to said four-branch MIMO system into a 5-bit bit pattern; and transmitting the combined rank information and modulation information related to said four-branch MIMO system as said bit pattern in a control channel to the UE;

wherein said combining the rank information and the modulation information related to said four-branch MIMO system into a bit pattern comprises mapping the rank information and the modulation information into the bit pattern according to the following bit mapping table:

| Bit Pattern | RI | Modulation-I | Modulation-II |
|---|---|---|---|
| 00000 | 1 | QPSK | NA |
| 00001 | 1 | 16 QAM | NA |
| 00010 | 1 | 64 QAM | NA |
| 00011 | 2 | QPSK | QPSK |
| 00100 | 2 | QPSK | 16 QAM |
| 00101 | 2 | QPSK | 64 QAM |
| 00110 | 2 | 16 QAM | QPSK |
| 00111 | 2 | 16 QAM | 16 QAM |
| 01000 | 2 | 16 QAM | 64 QAM |
| 01001 | 2 | 64 QAM | QPSK |
| 01010 | 2 | 64 QAM | 16 QAM |
| 01011 | 2 | 64 QAM | 64 QAM |
| 01100 | 3 | QPSK | QPSK |
| 01101 | 3 | QPSK | 16 QAM |
| 01110 | 3 | QPSK | 64 QAM |
| 01111 | 3 | 16 QAM | QPSK |
| 10000 | 3 | 16 QAM | 16 QAM |
| 10001 | 3 | 16 QAM | 64 QAM |
| 10010 | 3 | 64 QAM | QPSK |
| 10011 | 3 | 64 QAM | 16 QAM |
| 10100 | 3 | 64 QAM | 64 QAM |
| 10101 | 4 | QPSK | QPSK |
| 10110 | 4 | QPSK | 16 QAM |
| 10111 | 4 | QPSK | 64 QAM |
| 11000 | 4 | 16 QAM | QPSK |
| 11001 | 4 | 16 QAM | 16 QAM |
| 11010 | 4 | 16 QAM | 64 QAM |
| 11011 | 4 | 64 QAM | QPSK |
| 11100 | 4 | 64 QAM | 16 QAM |
| 11101 | 4 | 64 QAM | 64 QAM |
| 11110 | NA | NA | NA |
| 11111 | NA | NA | NA | where RI denotes 'Rank Information', QPSK denotes 'Quadrature Phase Shift Keying', QAM denotes 'Quadrature Amplitude Modulation', NA denotes 'Not Applicable', and Modulation-I and Modulation-II denotes modulation for different transport blocks.

21. A method of receiving and processing information from a node in a High Speed Packet Access (HSPA) system, said method comprising:

receiving, in a control channel from the node, information including a 5-bit bit pattern representing combined rank information and modulation information related to a four-branch Multiple Input Multiple Output (MIMO) system, wherein the rank information indicates a number of transport blocks, from one to four, to be simultaneously transmitted on the data channel associated with the control channel; and processing the received information, including decombining the combined rank information and modulation information related to said four-branch MIMO system, wherein said processing the received information comprises mapping the bit pattern into rank information and modulation information according to the following bit mapping table:

| Bit Pattern | RI | Modulation-I | Modulation-II |
|---|---|---|---|
| 00000 | 1 | QPSK | NA |
| 00001 | 1 | 16 QAM | NA |
| 00010 | 1 | 64 QAM | NA |
| 00011 | 2 | QPSK | QPSK |
| 00100 | 2 | QPSK | 16 QAM |
| 00101 | 2 | QPSK | 64 QAM |
| 00110 | 2 | 16 QAM | QPSK |
| 00111 | 2 | 16 QAM | 16 QAM |
| 01000 | 2 | 16 QAM | 64 QAM |
| 01001 | 2 | 64 QAM | QPSK |
| 01010 | 2 | 64 QAM | 16 QAM |
| 01011 | 2 | 64 QAM | 64 QAM |
| 01100 | 3 | QPSK | QPSK |
| 01101 | 3 | QPSK | 16 QAM |
| 01110 | 3 | QPSK | 64 QAM |
| 01111 | 3 | 16 QAM | QPSK |
| 10000 | 3 | 16 QAM | 16 QAM |
| 10001 | 3 | 16 QAM | 64 QAM |
| 10010 | 3 | 64 QAM | QPSK |
| 10011 | 3 | 64 QAM | 16 QAM |
| 10100 | 3 | 64 QAM | 64 QAM |
| 10101 | 4 | QPSK | QPSK |
| 10110 | 4 | QPSK | 16 QAM |
| 10111 | 4 | QPSK | 64 QAM |
| 11000 | 4 | 16 QAM | QPSK |
| 11001 | 4 | 16 QAM | 16 QAM |
| 11010 | 4 | 16 QAM | 64 QAM |
| 11011 | 4 | 64 QAM | QPSK |
| 11100 | 4 | 64 QAM | 16 QAM |
| 11101 | 4 | 64 QAM | 64 QAM |
| 11110 | NA | NA | NA |
| 11111 | NA | NA | NA | where RI denotes 'Rank Information', QPSK denotes 'Quadrature Phase Shift Keying', QAM denotes 'Quadrature Amplitude Modulation', NA denotes 'Not Applicable', and Modulation-I and Modulation-II denotes modulation for different transport blocks.

* * * * *

UNITED STATES PATENT AND TRADEMARK OFFICE
CERTIFICATE OF CORRECTION

PATENT NO. : 9,723,601 B2
APPLICATION NO. : 13/816323
DATED : August 1, 2017
INVENTOR(S) : Nammi It is certified that error appears in the above-identified patent and that said Letters Patent is hereby corrected as shown below:

In Column 5, Line 67, delete "RNC's" and insert -- RNCs --, therefor.

In Column 19, Line 30, in Claim 15, delete "User" and insert -- A user --, therefor.

Signed and Sealed this
Fifth Day of June, 2018

Andrei Iancu
*Director of the United States Patent and Trademark Office*